United States Patent
Furuta

(10) Patent No.: US 11,807,063 B2
(45) Date of Patent: Nov. 7, 2023

(54) ROAD SURFACE INFORMATION PRODUCING APPARATUS AND VEHICLE CONTROL SYSTEM

(71) Applicant: TOYOTA JIDOSHA KABUSHIKI KAISHA, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 17/481,392

(22) Filed: Sep. 22, 2021

(65) Prior Publication Data
US 2022/0126642 A1   Apr. 28, 2022

(30) Foreign Application Priority Data
Oct. 23, 2020  (JP) ................. 2020-178283

(51) Int. Cl.
| | | |
|---|---|---|
| B60G 17/0165 | (2006.01) | |
| G01C 21/30 | (2006.01) | |
| B60W 50/00 | (2006.01) | |
| B60W 40/06 | (2012.01) | |

(52) U.S. Cl.
CPC ......... *B60G 17/0165* (2013.01); *B60W 40/06* (2013.01); *B60W 50/00* (2013.01); *G01C 21/30* (2013.01); *B60G 2400/20* (2013.01); *B60G 2400/252* (2013.01); *B60G 2400/821* (2013.01); *B60G 2500/104* (2013.01); *B60W 2050/006* (2013.01); *B60W 2510/22* (2013.01); *B60W 2520/10* (2013.01); *B60W 2520/12* (2013.01); *B60W 2530/10* (2013.01); *B60W 2552/35* (2020.02); *B60W 2710/226* (2013.01)

(58) Field of Classification Search
CPC .................................................. B60G 17/0165
See application file for complete search history.

(56) References Cited

U.S. PATENT DOCUMENTS

| 10,011,960 | B2 * | 7/2018 | Tani ........................ E01C 23/01 |
|---|---|---|---|
| 10,828,953 | B2 * | 11/2020 | Anderson ............... F16F 9/512 |
| 11,543,425 | B2 * | 1/2023 | Kimura .................... G01P 3/44 |
| 2017/0274724 | A1 | 9/2017 | Liu |
| 2018/0154723 | A1 | 6/2018 | Anderson et al. |
| 2022/0126642 | A1 * | 4/2022 | Furuta .................... G01C 21/30 |

FOREIGN PATENT DOCUMENTS

| JP | 2016-192028 A | 11/2016 |
|---|---|---|
| JP | 2017-171156 A | 9/2017 |
| JP | 2020-016541 A | 1/2020 |
| JP | 2020-026187 A | 2/2020 |

\* cited by examiner

*Primary Examiner* — Michael A Berns
(74) *Attorney, Agent, or Firm* — Sughrue Mion, PLLC

(57) ABSTRACT

The cloud includes a server and a storage device. The storage device includes a road surface information map. When a first sampling distance is equal to or longer than a first distance threshold, the server performs re-sampling to interpolate data in such a manner that sampling positions located at a second sampling distance and unsprung mass member displacements of the respective sampling positions exist so as to produce re-sampled data-for-producing-map. The server stores a sub-sectional unsprung mass displacement in a storage area corresponding to a sub-section of the road surface information map, based on the re-sampled data-for-producing-map.

8 Claims, 8 Drawing Sheets

ROAD SURFACE INFORMATION PRODUCING APPARATUS AND VEHICLE CONTROL SYSTEM

TECHNICAL FIELD

The present disclosure relates to a road surface information producing apparatus for producing (creating) a road surface information map (look-up table) used for a preview damping control, and a vehicle control system including the road surface information producing apparatus.

BACKGROUND

A conventionally known preview damping control is a control to damp/reduce a sprung mass vibration by varying, based on a road surface displacement correlating value that correlates with a vertical displacement of a road surface in front of a vehicle, a force acting between an unsprung mass member and a sprung mass member, so as to compensating/prevent a delay in the control (refer to U.S. Unexamined Patent Application Publication No. 2018/0154723). In other words, the conventional preview damping control is the control to foresee the road surface displacement correlating value and control a damping force based on that value.

A known method for foreseeing information on the road surface includes a step of producing/creating a database by storing the road surface displacement correlating value in a cloud in advance, and a step of receiving the road surface displacement correlating value from the cloud through a communication link while the vehicle is traveling.

SUMMARY

The inventor of the present disclosure has been studying producing/creating the road surface information look-up table (i.e., road surface information map) as the database. A virtual area corresponding to a predetermined section of a road is divided/partitioned into a plurality of sections (i.e., divided sections or sub-sections) having the same size as each other. The road surface information map has storage areas corresponding to the respective sub-sections. Sub-sectional road surface displacement correlating values, each correlating with a road surface vertical displacement of each sub-section, are stored in the respective storage areas. In addition, the inventor has been studying a road surface information producing apparatus that produces/creates the road surface information map. The road surface information producing apparatus of a vehicle acquires a road surface displacement correlating value based on a sensor value that a sensor mounted on the vehicle has detected at a sensor detecting position (e.g., at a location of a wheel of the vehicle), every time the vehicle travels through a predetermined section of the road. The road surface information producing apparatus stores, based on the acquired road surface displacement correlating value, a sub-sectional road surface displacement correlating value in one of the storage areas that corresponds to the sub-section (divided section) to which a sampling position/location belongs, wherein the sampling position is a position at which the road surface displacement correlating value was obtained.

However, it has turned out that the above-described road surface information producing apparatus may need to be improved in terms of the following points.

That is, the road surface displacement correlating value is acquired at a frequency (i.e., at a sampling frequency) corresponding to a constant sampling time or sampling time interval, based on the sensor value detected by the sensor mounted on the vehicle. Therefore, a distance between two adjacent sampling positions for the road surface displacement correlating values becomes longer as compared to a distance/length of a side of the sub-section (divided section), as a vehicle speed (a running speed of the vehicle) becomes higher. For example, assuming that the sampling frequency is 100 Hz and the vehicle speed is 72 km/h, the distance between two adjacent sampling positions for the road surface displacement correlating values is 200 mm, that is relatively long with respect to the distance/length of the side of the sub-section (e.g., 100 mm). This may cause a case where a road surface displacement correlating value cannot be acquired (or does not exist) for a particular sub-section through which the sensor detecting position has actually passed. When this happens, the above-described road surface information producing apparatus cannot store the sub-sectional road surface displacement correlating value in the storage area corresponding to that particular sub-section, resulting in failing to effectively/efficiently produce/create the road surface information map.

Furthermore, the number of the road surface displacement correlating values acquired for a single sub-section decreases (e.g., down to only one) as the vehicle speed becomes higher. Thus, when the vehicle speed is relatively high, and if the vertical displacement of a road surface varies widely within a part of the road that corresponds to a single sub-section, the sub-sectional road surface displacement correlating value for that single sub-section may greatly differ from a true value of an average of the actual road surface displacement correlating values for the part of the road corresponding to that single sub-section. This may decrease/degrade accuracy of the sub-sectional road surface displacement correlating value stored in the storage area corresponding to that single sub-section.

The present disclosure is made to cope with the problems described above. One of objectives of the present disclosure is to provide a road surface information producing apparatus and a vehicle control system that are capable of effectively/efficiently producing/creating a road surface information map (look-up table) that is highly accurate. Hereinafter, a road surface information producing apparatus according to the present disclosure may sometimes be referred to as a "present disclosure road surface information producing apparatus". A vehicle control system according to the present disclosure may sometimes be referred to as a "present disclosure vehicle control system".

The present disclosure road surface information producing apparatus (CL1) comprises:
- a storage device (42) including a road surface information map (42a) that has storage areas corresponding to respective sub-sections (Gd) into which a virtual area (DRj) corresponding to a predetermined section of a road (ARj) is divided, wherein a sub-sectional road surface displacement correlating value correlated with a vertical displacement of a road surface of a certain sub-section among the sub-sections is stored in the storage area that corresponds to the certain sub-section; and
- an information processing device (41) configured to store the sub-sectional road surface displacement correlating value in the storage area of the road surface information map.

The information processing device is configured to:
- obtain first data (step 505) from a vehicle (10) via a communication link when the vehicle travels through each section, the first data including:

a sensor value, detected by a road-surface-correlating-information sensor (RS1, 31, 32, 33) mounted on the vehicle and necessary to obtain the sub-sectional road surface displacement correlating value, and a time at which the sensor value was detected; and position information correlated with a position of the vehicle obtained by a position information obtaining device mounted on the vehicle, and a time at which the position information was obtained; and obtain second data (step 510), based on the first data, the second data including time series data for acquiring a data set that includes a plurality of sets each of which includes a road surface displacement correlating value correlated with a vertical displacement of a road surface and a sampling position that is a detecting position of the road surface displacement correlating value;

obtain the data set from the second data (step 515);

calculate a first sampling distance that corresponds to a distance between two of the sampling positions adjacent to each other in the data set obtained from said second data (step 525);

reacquire, when the first sampling distance is longer than a first distance (Yes determination at step 530), the data set (from data obtained) by performing re-sampling to execute an interpolation using the second data in such a manner that any one of distances between two of sampling positions adjacent to each other is equal to or shorter than the first distance threshold and the road surface displacement correlating value corresponding to each of the sampling positions exists (step 535, step 715); and calculate, using the data set, a first average indicative of an average of the road surface displacement correlating values of the sampling positions included in a particular sub-section of a plurality of the sub-sections, for each the sub-particular section, the particular sub-section being a sub-section to which the sampling position belongs, and store, as the sub-sectional road surface displacement correlating value, the first average in the storage area that corresponds to the particular sub-section (step 540, step 605 to step 635).

According to the present disclosure road surface information producing apparatus, the re-sampling to execute the interpolation using the second data is performed, when the first sampling distance is long as compared to the distance of the side of the sub-section. This reduces a possibility that the road surface displacement correlating value does not exist for a certain sub-section that corresponds to a part of a road through which the sensor detecting position of the road-surface-correlating-information sensor has passed. Furthermore, since the number of the road surface displacement correlating values for one sub-section is increased, the sub-sectional road surface displacement correlating value can be made closer to a true value of an average of the road surface displacement correlating values of a part of the road corresponding to each of the sub-sections. Accordingly, the present disclosure road surface information producing apparatus can efficiently produce/generate the road surface information map storing more accurate data.

In one of the embodiments,
the information processing device is configured to:
obtain a vehicle speed of the vehicle of when the vehicle travels through the predetermined section from the vehicle via the communication link (step 505 shown in FIG. 7);
obtain, as the second data, time series data of the road surface displacement correlating value and time series data of a detecting position of the road-surface-correlating-information sensor from the first data (step 505 and step 705); and
calculate the first sampling distance by multiplying the vehicle speed by a sampling time interval that is either a sampling time interval of the time series data of the road surface displacement correlating value or a sampling time interval of the time series data of a detecting position of the road-surface-correlating-information sensor, whichever is longer (step 710).

According to the above-described embodiment, the first sampling distance is obtained based on the vehicle speed and the above-described sampling time interval. Thus, the first sampling distance becomes longer, as the vehicle speed becomes higher. Accordingly, when the first sampling distance is long as compared to the distance of the one side of the sub-section due to the high vehicle speed, re-sampling is performed with respect to the second data. This allows the example to efficiently produce/generate the road surface information map storing more accurate data.

In one of the embodiments,
the information processing device is configured to:
obtain a vehicle speed of the vehicle of when the vehicle travels through the predetermined section from the vehicle via the communication link (step 505 shown in FIG. 5);
obtain time series data of the road surface displacement correlating value and time series data of a detecting position of the road-surface-correlating-information sensor from the first data (step 505 and step 510, shown in FIG. 5);
perform an interpolation process on either the time series data of the road surface displacement correlating value or the time series data of a detecting position of the road-surface-correlating-information sensor in such a manner that both of the road surface displacement correlating value and the detecting position exist at a sampling time having (that comes at) a sampling time interval of the time series data of the road surface displacement correlating value or a sampling time interval of the time series data of a detecting position of the road-surface-correlating-information sensor, whichever is shorter, and obtain, as the second data, data including "an interpolated data that is one of the time series data that has been interpolated" and "the other of the time series data" among "the time series data of the road surface displacement correlating value and the time series data of a detecting position of the road-surface-correlating-information sensor" (step 515 shown in FIG. 5); and
calculate the first sampling distance by multiplying the vehicle speed by a sampling time interval that is either the sampling time interval of the time series data of the road surface displacement correlating value or the sampling time interval of the time series data of a detecting position of the road-surface-correlating-information sensor, whichever is shorter (step 525 shown in FIG. 5).

According to the above-described embodiment, the first sampling distance is obtained based on the vehicle speed and the above-described sampling time interval. Thus, the first sampling distance becomes longer, as the vehicle speed becomes higher. Accordingly, when the first sampling distance is long as compared to the distance of the one side of the sub-section due to the high vehicle speed, the re-sampling is performed with respect to the second data. This allows the above-described embodiment to efficiently produce/generate the road surface information map storing more accurate data.

In one of the embodiments, the information processing device is configured to perform the re-sampling process in such a manner that each distance between two adjacent sampling positions is a constant second sampling distance that is equal to or shorter than the first distance threshold.

According to the above-described embodiment, the re-sampling process is performed in such a manner that each distance between two adjacent sampling positions is the constant second sampling distance that is equal to or shorter than the first distance threshold so that the road surface displacement correlating value at each of that sampling positions exists. In this case, the second sampling distance (d2) is shorter than the first sampling distance (d1). Therefore, the number of the road surface displacement correlating values (e.g., unsprung mass displacements z1) obtained for one sub-section (Gd) is increased.

In one of the embodiments, the information processing device is configured to perform the re-sampling process (step 535 shown in FIG. 8) when the first sampling distance is equal to or shorter than a second distance threshold that has been set at a distance shorter than the second sampling distance (Yes determination at step 810 shown in FIG. 8).

According to the above-described embodiment, the re-sampling process is also performed when the distance between two adjacent sampling positions is too short as compared to the distance of the side of the sub-section. This allows the above-described modification to decrease a possibility that the road surface displacement correlating values that are obtained when the vehicle speed is too low greatly and excessively affects the sub-sectional road surface displacement correlating value.

In one of the embodiments, the information processing device is configured to newly store, when the sub-sectional road surface displacement correlating value has already been stored in the storage area that corresponds to the particular sub-section, a second average in the storage area that corresponds to the particular sub-section, as an updated sub-sectional road surface displacement correlating value, the second average representing an average among the road surface displacement correlating values of the sampling positions included in the particular sub-section and the sub-sectional road surface displacement correlating value that has already been stored in the storage area (step 605 to step 635).

According to the above-described embodiment, when the information processing device is configured to newly store, when the sub-sectional road surface displacement correlating value has already been stored, the second average in the storage area that corresponds to the particular sub-section, as an updated sub-sectional road surface displacement correlating value. The second average represents an average among the road surface displacement correlating values of the sampling positions included in the particular sub-section and the sub-sectional road surface displacement correlating value that has already been stored in the storage area. Accordingly, the sub-sectional road surface displacement correlating value to be stored in the storage area corresponding to a certain sub-section can be made closer to a true value of an average of the road surface displacement correlating values of a part of the road corresponding to the certain sub-section, as the number of the road surface displacement correlating values for the certain sub-section becomes larger when a large number of vehicles runs through that certain sub-section. This allows the above-described embodiment to produce the road surface information map storing much more accurate data.

In some embodiments,
the road surface displacement correlating value is an unsprung mass displacement representing a vertical displacement of an unsprung mass member of the vehicle, and
the sensor value is either a combination of a vertical acceleration of a sprung mass member of the vehicle and a vertical relative displacement between the sprung mass member and the unsprung mass member, or a vertical acceleration of the unsprung mass member.

According to the above-described embodiment, the unsprung mass displacement is used as the road surface displacement correlating value. The unsprung mass displacement is a value indicative of a vertical displacement of the unsprung mass member that is actually displaced due to a vertical displacement of a road surface on which the vehicle actually travels. Thus, it is unlikely that the unsprung mass displacement includes large error. This allows the above-described embodiment to produce the road surface information map storing much more accurate data.

The present disclosure vehicle control system is a vehicle control system that includes a road surface information producing apparatus (CL1), a first vehicle (10), and a second vehicle (10), that are communicable to one another.

The road surface information producing apparatus (CL1) comprises:
a storage device (42) including a road surface information map (42a) that has storage areas corresponding to respective sub-sections (Gd) into which a virtual area (DRj) corresponding to a predetermined section of a road (ARj) is divided, wherein a sub-sectional road surface displacement correlating value correlated with a vertical displacement of a road surface of a certain sub-section among the sub-sections is stored in the storage area that corresponds to the sub-certain section; and
an information processing device (41) configured to store the sub-sectional road surface displacement correlating value in the storage area of the road surface information map.

The information processing device is configured to:
obtain first data (step 505) from the first vehicle via a communication link when the first vehicle travels through the predetermined section, the first data including:
a sensor value detected by a road-surface-correlating-information sensor (RS1, 31, 32, 33) mounted on the first vehicle and necessary to obtain the sub-sectional road surface displacement correlating value and a time at which the sensor value was detected; and
position information correlated with a position of the first vehicle obtained by a position information obtaining device mounted on the first vehicle and a time at which the position information was detected; and
obtain second data (step 510), based on the first data, the second data including time series data for acquiring a data set that includes a plurality of sets each of which includes a road surface displacement correlating value correlated with a vertical displacement of a road surface and a sampling position that is a detecting position of the road surface displacement correlating value;
obtain the data set from the second data (step 515);

calculate a first sampling distance that corresponds to a distance between two of the sampling positions adjacent to each other in the data set obtained from said second data (step 525);

reacquire, when the first sampling distance is longer than a first distance (Yes determination at step 530), the data set (from data obtained) by performing re-sampling to execute an interpolation using the second data in such a manner that any one of distances between two of sampling positions adjacent to each other is equal to or shorter than the first distance threshold and the road surface displacement correlating value corresponding to each of the sampling positions exists (step 535, step 715); and calculate, using the data set, a first average indicative of an average of the road surface displacement correlating values of the sampling positions included in a particular sub-section of a plurality of the sub-sections, for each the particular sub-section, the particular sub-section being a sub-section to which the sampling position belongs, and store, as the sub-sectional road surface displacement correlating value, the first average in the storage area that corresponds to the particular sub-section (step 540, step 605 to step 635).

At least one of the first vehicle and the second vehicle is configured to receive data for control from the road surface information producing apparatus so as to utilize the data for control for controlling the one of the first vehicle and the second vehicle, the data for control, obtained based on the road surface information map, including position information of the sub-section and the road surface displacement correlating value associated with the position information.

According to the present disclosure vehicle control system, the re-sampling to execute the interpolation using the second data is performed, when the first sampling distance is long as compared to the distance of the side of the sub-section. This reduces a possibility that the road surface displacement correlating value does not exist for a certain sub-section that corresponds to a part of a road through which the sensor detecting position of the road-surface-correlating-information sensor has passed. Furthermore, since the number of the road surface displacement correlating values for one sub-section is increased, the sub-sectional road surface displacement correlating value can be made closer to a true value of an average of the road surface displacement correlating values of a part of the road corresponding to each of the sub-sections. Accordingly, the present disclosure vehicle control system can efficiently produce/generate the road surface information map storing more accurate data. Furthermore, the present disclosure vehicle control system allows at least one of the first vehicle and the second vehicle to receive data for control from the thus produced road surface information map so as to utilize the data for control for controlling the one of the first vehicle and the second vehicle, the data for control including position information of the sub-section and the sub-sectional road surface displacement correlating value associated with the position information.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure are not limited to those in the embodiments defined by the names and/or the symbols.

DETAILED DESCRIPTION

First Embodiment

<Configuration>

Figure 1:
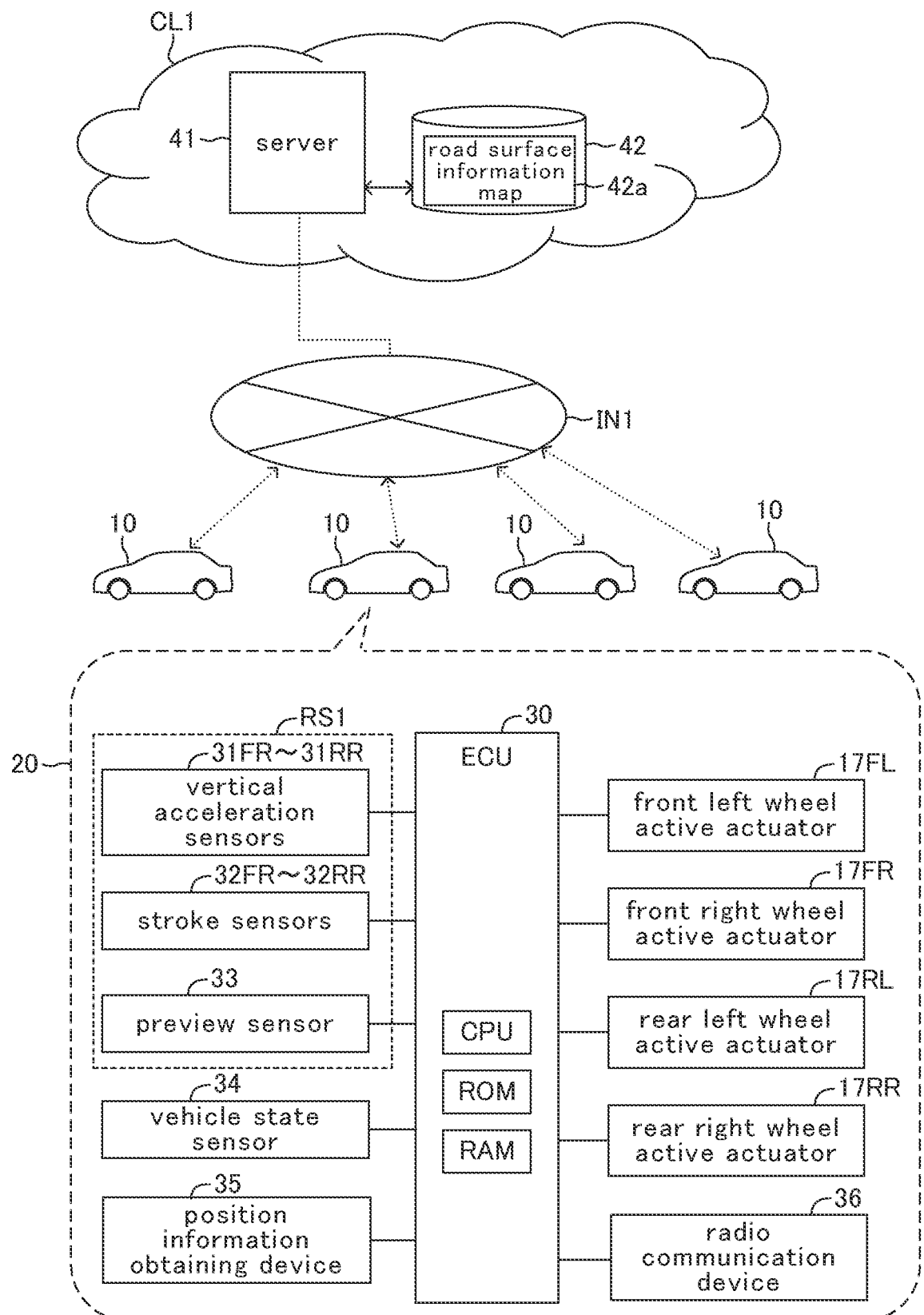
FIG. 1 is a schematic diagram of a preview damping control system including a road surface information producing apparatus according to an embodiment of the present disclosure.

FIG. 1 illustrates a preview damping control system (or a vehicle control system) that includes a road surface information producing apparatus (cloud CL1) according to a first embodiment of the present disclosure. The preview damping control system includes a plurality of vehicles 10 each having an on-board apparatus 20, and the cloud CL1. It should be noted that only four of the vehicles 10 having the same configurations as each other are illustrated in FIG. 1, as an example of a plurality of the vehicles.

Figure 2:
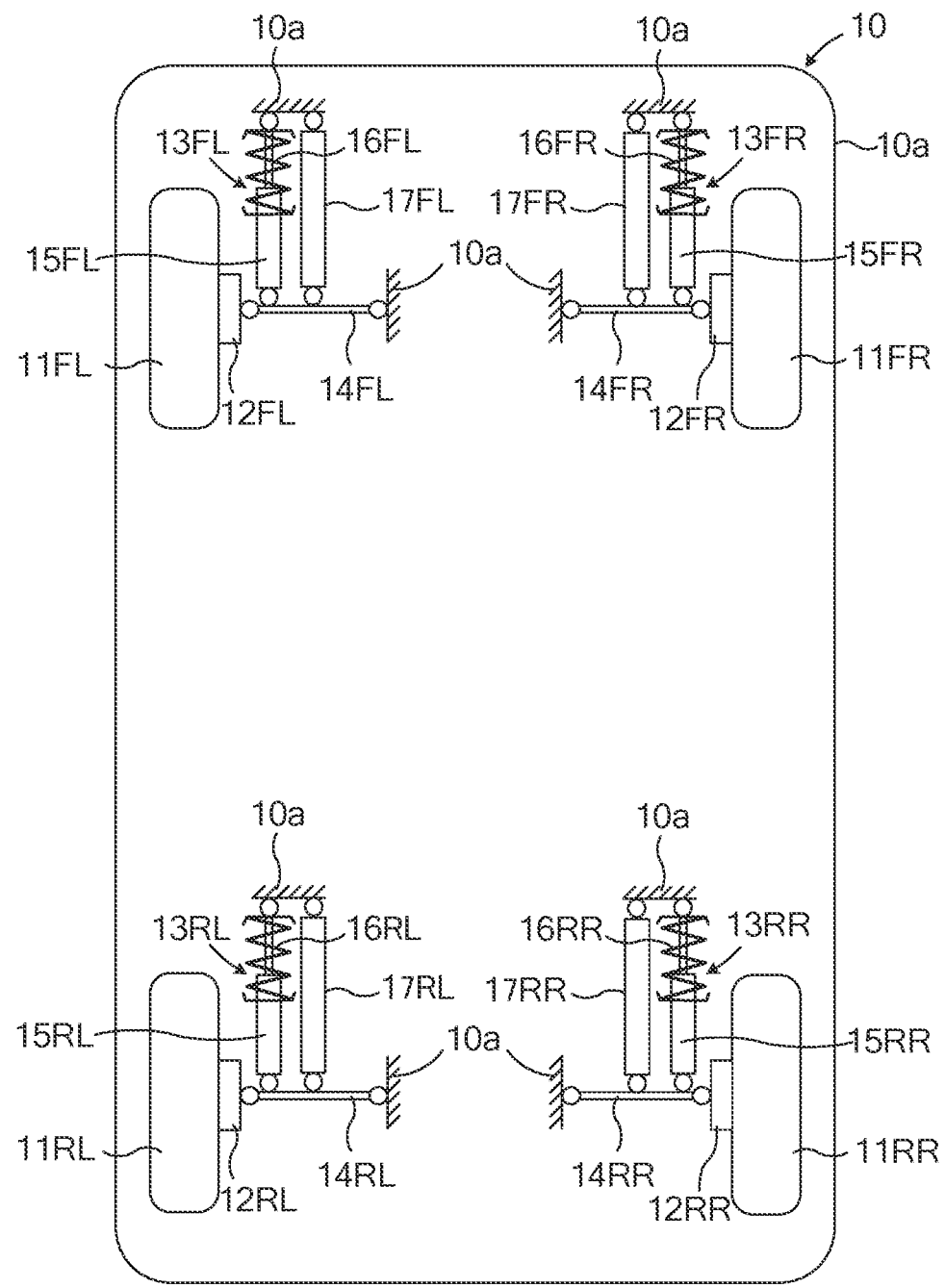
FIG. 2 is a schematic diagram of the vehicle shown in FIG. 1.

As shown in FIG. 2, the vehicle 10 comprises a front left wheel 11FL, a front right wheel 11FR, a rear left wheel 11RL, and a rear right wheel 11RR. The vehicle 10 also comprises wheel supporting members 12FL, 12FR, 12RL, and 12RR. When the wheels 11FL, 11FR, 11RL, and 11RR need not be distinguished from each other, each of them is sometimes referred to as a "wheel 11". When the wheel supporting members 12FL, 12FR, 12RL, and 12RR need not be distinguished from each other, each of them is sometimes referred to as a "wheel supporting member 12". The wheel 11 is rotatably supported by the wheel supporting member 12 (to a vehicle body 10a).

The vehicle 10 further comprises a front left suspension 13FL, a front right suspension 13FR, a rear left suspension 13RL, and a rear right suspension 13RR.

The front left suspension 13FL includes a suspension arm 14FL, a shock absorber 15FL, and a suspension spring 16FL, to suspend the front left wheel 11FL from the vehicle body 10a. A front left wheel active actuator 17FL is disposed/arranged between the vehicle body 10a and the shock absorber 15FL.

The front right suspension 13FR includes a suspension arm 14FR, a shock absorber 15FR, and a suspension spring 16FR, to suspend the front right wheel 11FR from the vehicle body 10a. A front right wheel active actuator 17FR is disposed/arranged between the vehicle body 10a and the shock absorber 15FR.

The rear left suspension 13RL includes a suspension arm 14RL, a shock absorber 15RL, and a suspension spring 16RL, to suspend the rear left wheel 11RL from the vehicle body 10a. A rear left wheel active actuator 17RL is disposed/arranged between the vehicle body 10a and the shock absorber 15RL.

The rear right suspension 13RR includes a suspension arm 14RR, a shock absorber 15RR, and a suspension spring 16RR, to suspend the rear right wheel 11RR from the vehicle body 10a. A rear right wheel active actuator 17RR is disposed/arranged between the vehicle body 10a and the shock absorber 15RR.

When the front left suspension 13FL, the front right suspension 13FR, the rear left suspension 13RL, and the rear right suspension 13RR need not be distinguished from each other, each of them is sometimes referred to as a "suspension 13". When the suspension arms 14FL, 14FR, 14RL, and 14RR need not be distinguished from each other, each of them is sometimes referred to as a "suspension arm 14". When the shock absorbers 15FL, 15FR, 15RL, and 15RR need not be distinguished from each other, each of them is sometimes referred to as a "shock absorber 15". When the suspension springs 16FL, 16FR, 16RL, and 16RR need not be distinguished from each other, each of them is sometimes referred to as a "suspension spring 16". When the wheel active actuators 17FL, 17FR, 17RL, and 17RR need not be distinguished from each other, each of them is sometimes referred to as a "wheel active actuator 17".

The suspension arm 14 connects the wheel supporting member 12 supporting the wheel 11 to the vehicle body 10a.

The shock absorber 15 is disposed between the vehicle body 10a and the suspension arm 14. An upper end of the shock absorber 15 is connected to the vehicle body 10a. A lower end of the shock absorber 15 is connected to the suspension arm 14. The suspension spring 16 is elastically disposed between the vehicle body 10a and the suspension arm 14 through the shock absorber 15. Namely, an upper end of the suspension spring 16 is connected to the vehicle body 10a. A lower end of the suspension spring 16 is connected to a cylinder of the shock absorber 15. It should be noted that the shock absorber 15 in this embodiment is an invariable damping force shock absorber, however, the shock absorber 15 may be a variable damping force shock absorber.

The wheel actuator 17 is disposed/arranged in parallel with the shock absorber 15 and the suspension spring 16. The wheel actuator 17 functions as an actuator that variably generate, hydraulically or electro-magnetically, a force acting between the vehicle body 10a and the wheel 11. The wheel actuator 17 forms an active suspension together with the shock absorber 15, the suspension spring 16, and the like. The wheel actuator 17 may be a known actuator in the relevant technical field, as long as the wheel actuator 17 is controlled by an electronic control unit (hereinafter, referred to as an "ECU") 30 in such a manner that the wheel actuator 17 can generate the force (hereinafter, referred to as an "actuator force" or a "control force") Fc acting between the vehicle body 10a and the wheel 11.

Referring back to FIG. 1, the vehicle 10 comprises the on-board apparatus 20 that includes the ECU 30, vertical acceleration sensors 31FL, 31FR, 31RL, 31RR, stroke sensors 32FL, 32FR, 32RL, 32RR, a preview sensor 33, a vehicle state sensor 34, a position (location) information obtaining device 35, and a radio communication device 36. When the vertical acceleration sensors 31FL, 31FR, 31RL, and 31RR need not be distinguished from each other, each of them is sometimes referred to as a "vertical acceleration sensor 31". When the stroke sensors 32FL, 32FR, 32RL, and 32RR need not be distinguished from each other, each of them is sometimes referred to as a "stroke sensor 32".

The ECU 30 is an electronic control unit that includes a microcomputer as a main component, and is sometimes referred to as a controller. The microcomputer includes a CPU, a ROM, a RAM, and an interface (I/F). The CPU is configured and/or programmed to realize various functions by executing instructions (or programs, or routines) stored in the ROM.

The ECU 30 is connected to the vertical acceleration sensors 31FL, 31FR, 31RL, 31RR, the stroke sensors 32FL, 32FR, 32RL, 32RR, the preview sensor 33, the vehicle state sensor 34, and the position information obtaining device 35.

The vertical acceleration sensor 31 is configured to detect a vertical acceleration of the vehicle body 10a (i.e., the sprung mass member) of the vehicle 10 so as to generate a signal indicative of the detected vertical acceleration. The ECU 30 obtains the signal indicative of the detected vertical acceleration from the vertical acceleration sensor 31, every time a constant sampling time elapses. In addition, the ECU 30 uses an internal clock so as to obtain a time at which the ECU 30 obtains the signal indicative of the detected vertical acceleration. It should be noted that the sprung mass member includes parts in the side of the vehicle body 10a with respect to the suspension spring 16 among parts such as the vehicle body 10a, the shock absorber 15, or the like.

The stroke sensor 32 is disposed in association with the suspension 13. The stroke sensor 32 is configured to detect a vertical stroke of the suspension 13 so as to generate a signal indicative of the detected vertical stroke of the suspension 13. The vertical stroke of the suspension 13 is a relative displacement in a vertical direction between the sprung mass member and an unsprung member at a position corresponding to each wheel 11. The ECU 30 obtains the signal indicative of the detected vertical stroke from the stroke sensor 32, every time a constant sampling time elapses. In addition, the ECU 30 uses the internal clock so as to obtain a time at which the ECU 30 obtains the signal indicative of the vertical stroke. It should be noted that the unsprung mass member includes parts in the side of the wheel 11 with respect to the suspension spring 16 among parts such as the wheel 11 and shock absorber 15, or the like.

The preview sensor 33 may include at least one of camera sensor and LiDAR (radar sensor) (refer to Japanese Patent Application Laid-Open No. 2017-171156 and Japanese Patent Application Laid-Open No. 2020-26187, that are hereby incorporated by reference). The preview sensor 33 is configured to detect a vertical displacement of a road surface (hereinafter, sometimes referred to as a road surface vertical displacement) at a position ahead of the front wheel(s) 11 of the vehicle 10 by a predetermined distance (away from the front wheel(s) 11) so as to generate a signal indicative of the detected road surface vertical displacement. The ECU 30 obtains the signal indicative of the detected road surface vertical displacement from the preview sensor 33, every time a constant sampling time elapses. In addition, the ECU 30 uses the internal clock so as to obtain a time at which the ECU 30 obtains the signal indicative of the road surface vertical displacement.

The vertical acceleration sensor 31, the stroke sensors 32, and the preview sensor 33 function as sensors, each being configured to obtain/acquire:
- a sensor value indicative of a road surface displacement correlating value at a sensor detecting position of each of the sensors; or
- a sensor value that is used to obtain, through calculation, the road surface displacement correlating value at the sensor detecting position of each of the sensors.

Those sensor values are information indicative of a state amount of the vehicle that varies depending on concavity and convexity of the road surface, or information indicative of the concavity and convexity of the road surface. Hereinafter, each of those sensors is referred to as a "road-surface-correlating-information sensor RS1", for convenience sake. The road surface displacement correlating value is information correlating with the vertical displacement of the road surface that represents the concavity and convexity of the road surface. More specifically, the road surface displacement correlating value is a road surface vertical displacement $z0$ that is a vertical displacement of a road surface, or an unsprung mass displacement $z1$ that is a vertical displacement of the unsprung mass member. In the present example, the road surface displacement correlating value is the unsprung mass displacement $z1$. The vertical acceleration sensor 31 and the stroke sensor 32 obtain the sensor values from which the "unsprung mass displacement $z1$ at each of the sensor detecting position" can be calculated.

The vehicle state sensor 34 includes various sensors, each detecting a moving state of the vehicle 10. For instance, the vehicle state sensor 34 includes:

a vehicle speed sensor for detecting a running/traveling speed (i.e., vehicle speed) of the vehicle 10;

a front-rear direction acceleration sensor for detecting an acceleration of the vehicle 10 in a front-rear direction of the vehicle 10;

a lateral direction acceleration sensor for detecting an acceleration of the vehicle 10 in a lateral direction of the vehicle 10; and a yaw rate sensor for detecting a yaw rate of the vehicle 10.

The position information obtaining device 35 includes a GNSS (Global Navigation Satellite System) receiver and a map data base. The GNSS receiver receives signals (i.e., GNSS signals) transmitted from satellites included in the GNSS system for detecting a present/current position/location (hereinafter, referred to as a "present position") of the vehicle 10 at the present time point. The map data base has stored information including a road map information.

The position information obtaining device 35 obtains/specifies position information (e.g., latitude and longitude of the present position) indicative of the present position of the vehicle 10 based on the GNSS signals and a present time, every time a constant sampling time elapses, and outputs signals indicative of the obtained position information and the present time.

In the present embodiment, the sampling time of the position information obtaining device 35 is (has been set to be) longer than the sampling time of the sensor values of the road-surface-correlating-information sensor RS1. The ECU 30 obtains the signal indicative of the specified position information and the present time, every time a constant sampling time elapses.

The present position of the vehicle 10 obtained by the position information obtaining device 35 is actually a position of the GNSS receiver mounted on the vehicle 10. Meanwhile, in the ROM of the ECU 30, positional relationship information indicative of a positional relationship between the position of the GNSS receiver and the sensor detecting position of each road-surface-correlating-information sensor RS1 has been stored in advance. The ECU 30 specifies the sensor detecting position of each road-surface-correlating-information sensor RS1 every time the constant sampling time elapses, using the obtained present position of the vehicle 10, a moving direction of the vehicle 10, and the positional relationship information. The sensor detecting position is a position at which each road-surface-correlating-information sensor RS1 generates the detected signal (in other words, an absolute position at which the sensor obtains the sensor value) and is represented by, for example, latitude and longitude of that position. It should be noted that the position information obtaining device 35 may specify the sensor detecting position of each road-surface-correlating-information sensor RS1, and may transmit that specified sensor detecting position to the ECU 30.

The radio communication device 36 is a radio communication terminal configured to exchange information with the cloud CL1 through the communication link IN1.

The ECU 30 stores the sensor value of each sensor and the sensor detecting position together with a detection time at which the sensor value and the sensor detecting position are obtained in an unillustrated non-volatile storage device. The ECU 30 arranges the stored "sensor values and the sensor detecting positions" in time series order (in chronological order) for each of the sections of a road having the same distance as each other, so as to produce/generate "time series data of the sensor value and time series data of a detecting position" for each of the sections of the road. Each piece of the time series data of the sensor value and time series data of the detecting positions is associated/correlated with information indicative of the detection time at which each piece of the data is obtained. The ECU 30 transmits "the time series data of the sensor value and time series data of the detecting position" of each of the sensors to the cloud CL1 using the radio communication device 36, every time the vehicle 10 (the GNSS receiver) passes one of the sections of the road. It should be noted that "the time series data of the sensor value and time series data of the detecting position" may sometimes be referred to as "first data", for convenience sake.

The section (or zone) of a road may sometimes be referred to as an "objective section".

The time series data of the sensor value and the time series data of the detecting position that are transmitted from the ECU 30 to the cloud CL1 may sometimes be referred to as "objective section traveling data".

The time series data of the sensor value obtained by the road-surface-correlating-information sensor RS1 included in the objective section traveling data may sometimes be referred to as "objective section sensing data".

The time series data of the detecting position included in the objective section traveling data may sometimes be referred to as "objective section position information data".

Furthermore, the ECU 30 obtains a vehicle speed V of the vehicle 10 when the vehicle 10 travels through the objective section, the vehicle speed being an average of the vehicle speeds while the vehicle 10 travels through the objective section, and transmits the thus obtained vehicle speed V to the cloud CL1 together with the objective section traveling data every time the vehicle 10 passes through the objective section. It should be noted that the "vehicle speed V of the vehicle 10 calculated when the vehicle 10 travels through the objective section" may sometimes be referred to as an "objective section vehicle speed V". In the present embodiment, the ECU 30 calculates/acquires the objective section vehicle speed V based on changes in the positions of the vehicle 10 with respect to time obtained from the position information obtaining device 35. The ECU 30 may employ, as the objective section vehicle speed V, an average of the vehicle speeds of the vehicle 10 detected by the vehicle state sensor 34 for the objective section.

The cloud CL1 includes a server 41 and a storage device 42. The server 41 includes a microcomputer. The server 41 may include a plurality of servers. The storage device 42 may include a plurality of storage devices. The server 41 may sometimes be referred to as an "information processing device" for convenience sake. The server 41 can conduct a search for specific data stored in the storage device 42 and retrieve the data from the storage device 42. The server 41 can also write/store data in the storage device 42.

In addition, the server 41 processes data (perform processing the data) that the server 41 receives from/through the radio communication device 36. More specifically, the server 41 sequentially receives the objective section traveling data (that includes the objective section sensing data) and the objective section vehicle speed V through the communication link IN1 (internet link) from the radio communication device 36. The server 41 processes the objective section sensing data so as to produce/generate time series data of the unsprung mass displacement z1 (hereinafter, sometimes referred to as "objective section unsprung mass displacement data").

More specifically, the server 41 performs offline processing of the objective section sensing data. Such offline processing may include filtering processing, integration processing, and/or subtraction processing. In the present example, the objective section sensing data is the time series data of the vertical acceleration of the sprung mass member and the time series data of the vertical stroke. Hereinafter, the time series data of the vertical acceleration of the sprung mass member may sometimes be referred to as "objective section sprung mass member vertical acceleration data", and the time series data of the vertical stroke may sometimes be referred to as "objective section vertical stroke data".

The server 41 performs a second order integration process for the objective section sprung mass member vertical acceleration data to obtain second order integrated data, and then performs a subtraction process to subtract the objective section vertical stroke data from the second order integrated data so as to produce the objective section unsprung mass displacement data.

It should be noted that the server 41 may perform a bandpass filtering processing (hereinafter, sometimes referred to as a "BPF process") for the objective section sensing data to make a specific frequency band component of the objective section sensing data pass through. In this case, the server 41 uses thus filtered objective section sensing data so as to produce the objective section unsprung mass displacement data.

The specific frequency band has been set at a frequency band that includes/covers a resonance frequency of the sprung mass member. More specifically, the specific frequency band is equal to or higher than a first cutoff frequency and is equal to or lower than a second cutoff frequency. The first cutoff frequency is set at a frequency lower than the resonance frequency of the sprung mass member. The second cutoff frequency is set at a frequency lower than a resonance frequency of the unsprung mass member and higher than the resonance frequency of the sprung mass member.

Figure 3A:
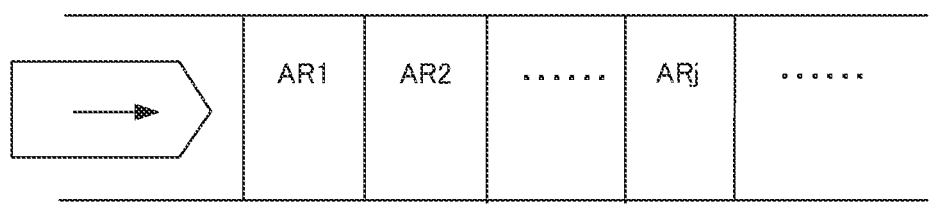
FIG. 3A is a figure illustrating a section of a road.
Figure 3B:
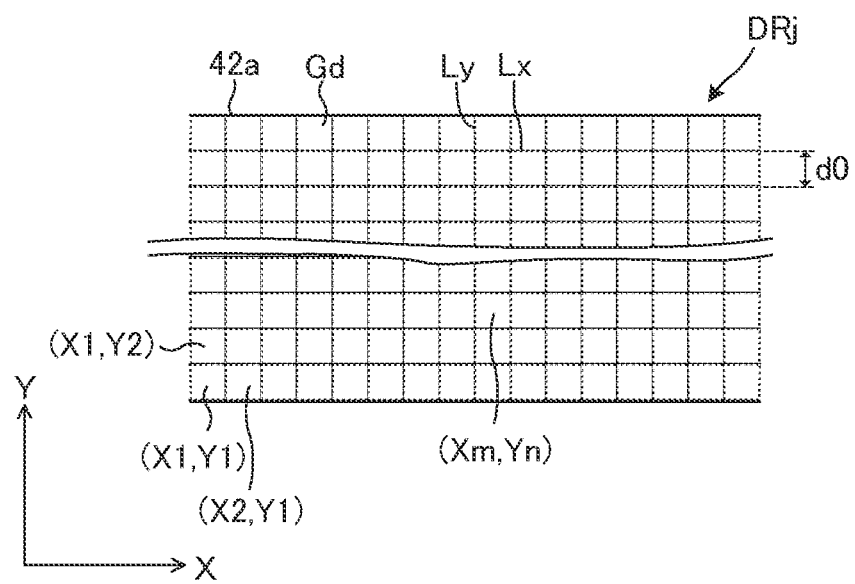
FIG. 3B is a figure illustrating a road surface information map.

The storage device 42 is configured such that data can be written into the storage device 42 and data can be read out from the storage device 42. The storage device 42 includes a road surface information map (look-up table). As shown in FIG. 3A, the road surface information map 42a is prepared for every single objective section ARj (in other words, for each of the sections ARj). FIG. 3B illustrates "the road surface information map 42a" corresponding to the single objective section ARj (that is AR1, in this example). The road surface information map is an aggregation of the road surface information maps such as the map 42a. A virtual area DRj corresponding to the single objective section ARj is divided into a plurality of square sub-sections Gd (referred to as a mesh) having the same size as each other, by lines Lx each parallel with an X axis and lines Ly each parallel with a Y axis. The virtual area DRj has a virtual position (specified by latitude and longitude) that corresponds to the position (specified by latitude and longitude) of the objective section ARj. The road surface information map 42a has storage areas, and is configured to store data in storage areas each of which corresponds to each of the sub-sections Gd. In the present example, a distance/length d0 of a side of the sub-section Gd is a constant length (typically, 100 mm) equal to or longer than 50 mm and equal to or shorter than 150 mm. It should be noted that a shape of the sub-section Gd is not limited to a square, and may be a shape determined based on "a size and a shape of a ground contact area of a tire of the wheel 11" and "manageability/handleability of a control" described below. If the shape of the sub-section Gd is a rectangle, a distance d0 of a side of the sub-section Gd is defined as the maximum length among lengths of sides of the sub-section Gd.

The X axis direction of the road surface information map 42a may be northward, and the Y axis direction of the road surface information map 42a is a direction that is orthogonal to the X axis direction. It should be noted that the X axis direction of the road surface information map 42a may be an azimuth direction that is parallel to a direction of travel of a road (i.e., the direction of forward movement of a vehicle on the road). That is, for instance, if the road is a straight road extending in east and west direction, the X axis direction of the road surface information map 42a may be westward. A position in the X axis direction of each of the sub-sections Gd is represented by an index Xm (m=1, 2, 3, . . . ), and a position in the Y axis direction of each of the sub-sections Gd is represented by an index Yn (n=1, 2, 3, . . . ). In other words, one of the sub-sections Gd that corresponds to a part of the certain objective section ARj is identified by an index Aj(Xm, Yn). Here, "Aj" is an identification number of the road surface information map 42a (or the virtual area DRj) corresponding to the objective section ARj, wherein j is a positive integer. When an index Aj(Xm, Yn) is given, the road surface information map 42a that corresponds to the objective section ARj is identified, and (the position of) the sub-section Gd that corresponds to the index Aj(Xm, Yn) is identified. The position of the sub-section Gd may be represented by latitude and longitude of a barycentric position of the sub-section Gd, for example.

In the storage area corresponding to each of the sub-sections Gd of the road surface information map 42a, a sub-sectional road surface displacement correlating value that correlates with a road surface vertical displacement of a surface of a part of a road corresponding to the each of the sub-sections Gd is stored. In the present example, the sub-sectional road surface displacement correlating value is the sub-sectional unsprung mass displacement Z1 that is calculated based on the unsprung mass displacement z1 that varies depending on a part of a road corresponding to the each of the sub-sections Gd. In this manner, the road surface information map 42a is configured to store the sub-sectional unsprung mass displacement Z1 while associating the sub-sectional unsprung mass displacement Z1 with the each (of the position) of the sub-sections Gd of the road surface information map 42a. Furthermore, a counter Nnew indicative of the number of the unsprung mass displacement z1 used to calculate the sub-sectional unsprung mass displacement Z1 (for the sub-section Gd) is stored in the storage area corresponding to each of the sub-sections Gd. The sub-sectional unsprung mass displacement Z1 and the counter Nnew will be described in detail later.

When the road surface information map 42a is at an initial state, an initial value (e.g., "0") as the sub-sectional unsprung mass displacement Z1 is stored in the storage area corresponding to each of the sub-sections Gd. In other words, when the road surface information map 42a is at the initial state, the sub-sectional unsprung mass displacement Z1 that is meaningful is not stored. In addition, when the road surface information map 42a is at the initial state, an initial value (e.g., "0") as the counter Nnew is stored in the storage area corresponding to each of the sub-sections Gd. The road surface information map 42a is used to obtain preview control referenced data for the preview damping control described later in detail. The preview control referenced data includes data on the position (positional data) of the sub-section Gd obtained based on the road surface information map 42a and the sub-sectional unsprung mass displacement Z1 associated that position of the sub-section Gd.

Referring back to FIG. 1, the ECU 30 is connected to the front left wheel actuator 17FL, the front right wheel actuator 17FR, the rear left wheel actuator 17RL, and the rear right wheel actuator 17RR, through unillustrated drive circuits.

The ECU 30 obtains through calculation a target control force Fct for damping (decreasing) a vibration of the sprung mass member of each wheel 11 based on an unsprung mass displacement z1 at a predicted passing through position of each wheel 11 described later. The ECU 30 instructs/controls the wheel actuator 17 in such a manner that the control force Fc generated by the wheel actuator 17R when each wheel 11 passes through (reaches) the predicted passing through position coincides with the target control force Fct.

<Outline of Preview Damping Control>

Hereinafter, a mass of the sprung mass member is represented as m2, an unsprung mass displacement (namely, a vertical displacement of the unsprung mass member) is represented as z1, and a sprung mass displacement (namely, a vertical displacement of the sprung mass member at each wheel 11) is represented as z2. In addition, a spring constant (equivalent spring constant) of the spring of the suspension 13 (e.g., the suspension spring 16) is represented as K, a damping coefficient (equivalent damping coefficient) of the damper of the suspension 13 (e.g., the shock absorber 15) is represented as C, and a control force generated by the wheel actuator 17 is represented as Fc.

Time derivative values of z1 and z2 are represented as dz1 and dz2, respectively. Second order time derivative values of z1 and z2 are represented as ddz1 and ddz2, respectively. The values of z1 and z2 become positive when the respective parts move upward. The forces generated by the spring, the damper, and the wheel actuator 17 have positive signs when direction of the respective forces is upward.

A motion equation regarding a vertical direction movement of the sprung mass member of the vehicle 10 is expressed as an equation (1) below.

$$m2 \cdot ddz2 = C \cdot (dz1 \cdot dz2) + K \cdot (z1-z2) - Fc \tag{1}$$

The damping coefficient C used in the equation (1) is assumed to be constant, however, the damping coefficient C may be a value varying depending on a time derivative value of a vertical stroke of the suspension 13, since an actual damping coefficient varies depending on a stroke rate of the suspension 13.

When the vibration of the sprung mass member is completely cancelled (eliminated) by the control Fc (in other words, when the sprung mass member acceleration ddz2, the sprung mass member displacement rate dz2, and the sprung mass member displacement z2 are all made to be zero), the control force Fc is expressed as an equation (2) below.

$$Fc = C \cdot dz1 + K \cdot z1 \tag{2}$$

Thus, the control force Fc that can cancel the vibration of the sprung mass member can be expressed as an equation (3) below. In the equation (3), α is a control gain that is an arbitrary constant value that is larger than 0, and equal to or smaller than 1.

$$Fc = \alpha \cdot (C \cdot dz1 + K \cdot z1) \tag{3}$$

By applying the equation (3) to the equation (1), the equation (1) can be expressed as an equation (4) below.

$$m2 \cdot ddz2 = C \cdot (dz1-dz2) + K \cdot (z1-z2) - \alpha \cdot (C \cdot dz1 + K \cdot z1) \tag{4}$$

When a Laplace transform is performed for the equation (4), and then the result is deformed, the equation (4) can be expressed as an equation (5) below. In the equation (5), "s" represents a Laplace operator.

$$\frac{z_2}{z_1} = \frac{(1-\alpha)(Cs+K)}{m_2 s^2 + Cs + K} \tag{5}$$

As understood from the equation (5), a magnitude of the transfer function varies depending on α, and becomes minimum when α is equal to 1. Therefore, the target control force Fct may be expressed as an equation (6) corresponding to the equation (3). In the equation (6), α·C and α·K are replaced with gains β1 and β2, respectively.

$$Fct = \beta 1 \cdot dz1 + \beta 2 \cdot z1 \tag{6}$$

The ECU 30 obtains the preview control referenced data for an area at which the wheel 11 is expected to reach (pass through) from the cloud CL1 using the communication link. The preview control referenced data may sometimes be referred to as "data for control". The ECU 30 obtains in advance (foresee), based on the preview control referenced data, the unsprung mass displacement z1 at a position (referred to as the "predicted passing through position") at which the wheel 11 is expected to reach (pass through) in the future (or later), and applies the thus obtained unsprung mass displacement z1 to the equation (6) so as to obtain the target control force Fct through calculation. Then, the ECU 30 lets the wheel actuator 17 generate the control force Fc corresponding (equal) to the calculated/obtained target control force Fct at a time point at which the wheel 11 actually reaches (passes through) the predicted passing through position (that is a time point at which the unsprung mass displacement z1 applied to the equation (6) actually appears). In this manner, the vibration of the sprung mass member is suppressed/reduced at the time point at which the wheel 11 actually reaches (passes through) the predicted passing through position (that is the time point at which the unsprung mass displacement z1 applied to the equation (6) actually appears).

The damping control for the sprung mass member has been described in the above. The damping control for the sprung mass member using the unsprung mass displacement z1 that is obtained in advance is the preview damping control of the present embodiment.

It should be noted that, in the above description, a mass of the unsprung mass member and an elastic deformation of the tire are ignored. In addition, it has been assumed/deemed that the road surface vertical displacement z0 and the unsprung mass displacement z1 are equal to each other. Therefore, a preview damping control similar to the above-described preview damping control can be carried out using the road surface vertical displacement z0 in place of the unsprung mass displacement z1.

An equation (7) described below is an equation to obtain the target control force Fct in a simpler way by omitting the derivative term ($\beta 1 \cdot dz1$) in the equation (6). In a case where the target control force Fct is calculated using the equation (7) as well, since the control force Fc ($=\beta 2 \cdot z1$) to cancel the vibration of the sprung mass member is generated from the wheel actuator 17, the amplitude of the vibration of the sprung mass member can be decreased as compared to a case where the control force Fc is not generated.

$$Fct = \beta 2 \cdot z1 \quad (7)$$

<Outline of Operation>

The server 41 obtains the "sub-sectional unsprung mass displacement Z1" for the sub-section Gd (corresponding to Aj(Xm, Yn)), based on the objective section traveling data (namely, the objective section sensing data and the objective section position information data) of the objective section ARj. The server 41 stores the thus obtained "sub-sectional unsprung mass displacement Z1" in the storage area that corresponds to that sub-section Gd. When a plurality of the unsprung mass displacements z1 have been obtained for a certain single sub-section Gd, the server 41 obtains an average of a plurality of the unsprung mass displacements z1, and stores the thus obtained average, as the "sub-sectional unsprung mass displacement Z1", in the storage area that corresponds to that certain single sub-section Gd.

More specifically, as described above, the server 41 produces the objective section unsprung mass displacement data by processing the objective section sensing data. The server 41 attempts to correlate "the unsprung mass displacement z1 included in the objective section unsprung mass displacement data" associated with a particular time to which the obtained displacement z1 corresponds with/to "the sensor detecting position included in the objective section position information data" associated with a "time that is the same as the particular time" at which the sensor detecting position was obtained. If the attempts is succeeded, the sever 41 can identify (determine) which sub-section Gd "each of the unsprung mass displacements z1 (sensor values) included in the objective section unsprung mass displacement data" belongs to.

However, in the present example, a sampling time interval $\Delta TP$ of the objective section position information data is longer than a sampling time interval $\Delta TB$ of the objective section unsprung mass displacement data ($\Delta TP > \Delta TB$). Therefore, there may not be the "position information in the objective section position information data" that has an associated time that matches (coincides with) any of the sampling time in the objective section unsprung mass displacement data. Accordingly, all of the objective section unsprung mass displacement data may not be necessarily utilized to produce data for the road surface information map 42a. Consequently, the road surface information map 42a storing accurate data cannot be produced efficiently.

In view of the above, firstly, the server 41 obtains a position (position information) that corresponds to each of the unsprung mass displacements z1 included in the objective section unsprung mass displacement data by performing a data interpolation processing (e.g., one of a well-known linear interpolation and a well-known spline interpolation) for the objective section position information data. Namely, the server 41 obtains a detecting position at a time with which each of the unsprung mass displacements z1 is associated, by performing the interpolation for the objective section position information data based on time. In other words, the position (position information) of the objective section unsprung mass displacement data that was not found in the objective section position information data is obtained by the interpolation. As a result, each of the position (position information) of the unsprung mass displacements z1 included in the objective section unsprung mass displacement data is identified/specified. It should be noted that a group of a set of the objective section unsprung mass displacement data and the interpolated objective section position information data may sometimes be referred to as "data-for-producing-map". As understood from the above interpolation, the data-for-producing-map includes the sets of the unsprung mass displacement z1 and the position (position information) corresponding to the unsprung mass displacement z1, each of the sets being obtained at the sampling time interval $\Delta TB$.

Meanwhile, as shown in FIG. 4B, it is assumed that a "set of an unsprung mass displacement z1 obtained at a first time ta and a position corresponding to this unsprung mass displacement z1" of the data-for-producing-map is a "set of an unsprung mass displacement z1a at a position shown by a first sampling point P1a and that position". It is also assumed that a "set of an unsprung mass displacement z1 obtained at a second time tb and a position corresponding to this unsprung mass displacement z1" of the data-for-producing-map is a "set of an unsprung mass displacement z1b at a position shown by a first sampling point P1b and that position". The second time tb is a time the sampling time interval $\Delta TB$ after the first time ta. Each of the first sampling points P1a and P1b is a point at which both of the unsprung mass displacement z1 and its position are identified (or exist) owing to the above-described data interpolation for the objective section position information data.

In this example, the first sampling point P1a corresponds/belongs to a sub-section Gd identified by Aj(X5,Y5), and the first sampling point P1b corresponds/belongs to a sub-section Gd identified by Aj(X7,Y6). In other words, the sub-section Gd identified by Aj(X5,Y5) includes the unsprung mass displacement z1a only, and the sub-section Gd identified by Aj(X7,Y6) includes the obtained unsprung mass displacement z1b only. Therefore, the unsprung mass displacement z1a may be stored as the sub-sectional unsprung mass displacement Z1 for the sub-section Gd identified by Aj(X5,Y5), and the unsprung mass displacement z1b may be stored as the sub-sectional unsprung mass displacement Z1 for the sub-section Gd identified by Aj(X7, Y6). However, a single unsprung mass displacement z1 may contain a greater error than an average of a plurality of unsprung mass displacements z1, with respect to a true unsprung mass displacement z1.

In addition, there is no data (no set of an unsprung mass displacements z1 and a position (position data) corresponding to that unsprung mass displacements z1) in each of the sub-section Gd identified by Aj(X6,Y5) and the sub-section Gd identified by Aj(X6,Y6), although a straight line Tr1 corresponding to a trace of the wheel 11 passes through each of those sub-sections Gd. Accordingly, data for each of those sub-sections Gd in the road surface information map 42a cannot be produced. Thus, the server 41 cannot produce the road surface information map 42a efficiently.

In view of the above, the server 41 calculates (obtains) a first sampling distance d1 in order for the server 41 to determine whether or not a further data processing ("re-sampling" described later) is necessary. More specifically, the server 41 multiplies the objective section vehicle speed V by the sampling time interval $\Delta TB$ to obtain the first sampling distance d1 (i.e., $d1=V\cdot\Delta TB$). The first sampling distance d1 is a distance between the position (sampling position) of the first sampling point P1a and the position (sampling position) of the first sampling point P1b that is adjacent to the first sampling point P1a.

Subsequently, the server 41 determines whether or not the first sampling distance d1 is longer than a predetermined first distance threshold dth1. The first distance threshold dth1 has been set at a value shorter than the distance d0 of the side of the sub-section Gd. In this example, the first distance threshold dth1 is one tenth of the distance d0 of the side of the sub-section Gd. When it is determined that the first sampling distance d1 is longer than the first distance threshold dth1, the server 41 re-samples the data-for-producing-map (the objective section unsprung mass displacement data and the interpolated objective section position information data).

More specifically, the server 41 obtains "an unsprung mass displacement z1 at a position (sampling position) of each of a plurality of second sampling points P2 and a position (position information) of that sampling position", through performing the interpolation using the unsprung mass displacement z1 and the position (position information) of each of the first sampling points P1a and P1b adjacent to each other. The second sampling points P2 are points between the first sampling points P1a and P1b. Namely, the server 41 further performs the data interpolation, in the same manner as described above, for the data-for-producing-map (the objective section unsprung mass displacement data and the interpolated objective section position information data) so as to increase the number of data (the number of a set of the unsprung mass displacement z1 and the position information) that is available for producing the road surface information map 42a. A distance between two positions of the adjacent second sampling points P2 has been set at a constant second sampling distance d2.

The second sampling distance d2 has been set at a distance equal to or shorter than the first distance threshold dth1. In this example, the second sampling distance d2 has been set at a distance equal to the first distance threshold dth1. The interpolation for the re-sampling is also based on one of the well-known methods such as a linear interpolation and a spline interpolation. It should be noted that the distance between two positions of the adjacent second sampling points P2 is not necessarily constant, as long as the distance between two positions of the adjacent second sampling points P2 is equal to or shorter than the first distance threshold dth1.

Thereafter, the server 41 determines which of the unsprung mass displacements z1 including thus interpolated unsprung mass displacements z1 belongs to which of the sub-sections Gd, using a plurality of sets of the unsprung mass displacement z1 and the sampling position (position information) obtained through the above-described re-sampling. Then, the server 41 calculates/obtains an average of the unsprung mass displacements z1 that have been determined to belong to a certain sub-section Gd as the sub-sectional unsprung mass displacement Z1 for that certain sub-section Gd, and stores the average in the storage area of the road surface information map 42a, the storage area corresponding to that certain sub-section Gd.

Figure 4:
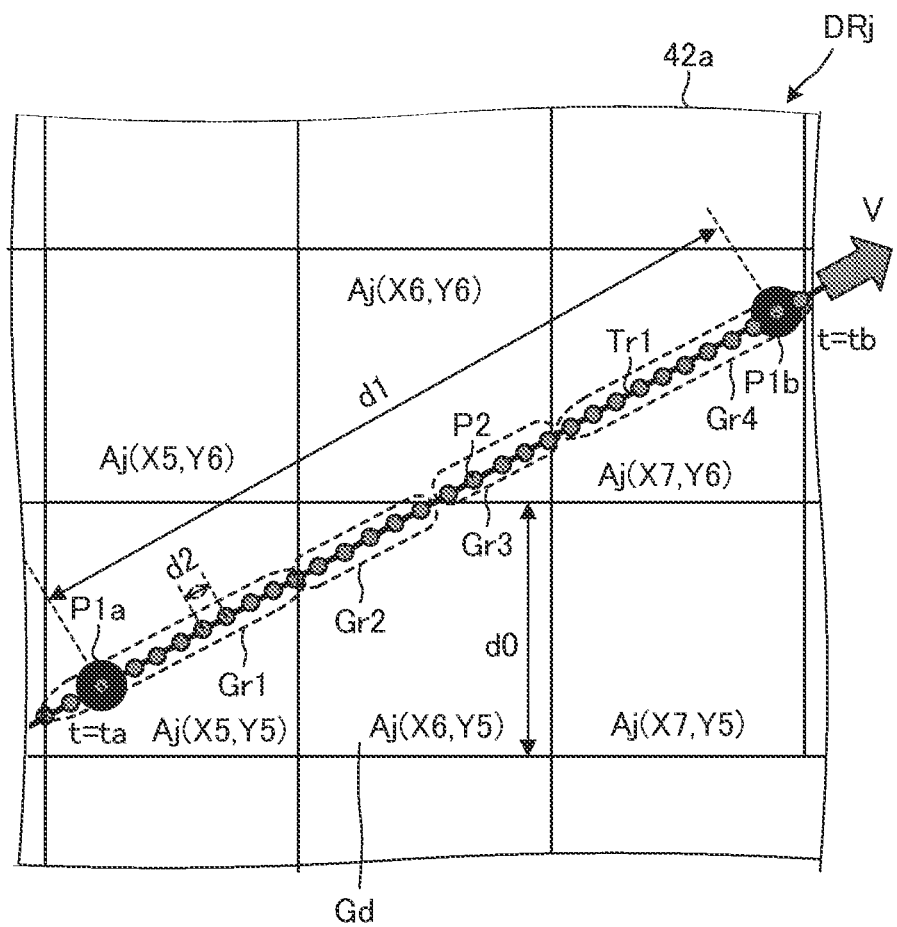
FIG. 4 is a figure for describing an outline of operations of the road surface information producing apparatus.

In the example shown in FIG. 4, the server 41 stores an average of the unsprung mass displacements z1 that correspond to a plurality of the second sampling points P2 within (surrounded by) a broken line Gr1 in the storage area corresponding to the sub-section Gd identified by Aj(X5, Y5), as the sub-sectional unsprung mass displacement Z1 for the sub-section Gd identified by Aj(X5, Y5).

Similarly, the server 41 stores an average of the unsprung mass displacements z1 that correspond to a plurality of the second sampling points P2 within (surrounded by) a broken line Gr2 in the storage area corresponding to the sub-section Gd identified by Aj(X6, Y5), as the sub-sectional unsprung mass displacement Z1 for the sub-section Gd identified by Aj(X6, Y5).

Similarly, the server 41 stores an average of the unsprung mass displacements z1 that correspond to a plurality of the second sampling points P2 within (surrounded by) a broken line Gr3 in the storage area corresponding to the sub-section Gd identified by Aj(X6, Y6), as the sub-sectional unsprung mass displacement Z1 for the sub-section Gd identified by Aj(X6, Y6).

Similarly, the server 41 stores an average of the unsprung mass displacements z1 that correspond to a plurality of the second sampling points P2 within (surrounded by) a broken line Gr4 in the storage area corresponding to the sub-section Gd identified by Aj(X7, Y6), as the sub-sectional unsprung mass displacement Z1 for the sub-section Gd identified by Aj(X7, Y6).

It should be noted that, in a case where the sub-sectional unsprung mass displacement Z1 for a certain sub-section Gd has already been stored in the storage area corresponding to that certain sub-section Gd when the sub-sectional unsprung mass displacement Z1 for that certain sub-section Gd is newly obtained/calculated, the server 41 updates the sub-sectional unsprung mass displacement Z1 for that certain sub-section Gd based on both of the sub-sectional unsprung mass displacement Z1 that has already been stored and the newly obtained sub-sectional unsprung mass displacement Z1 (or the unsprung mass displacements z1 that are used to calculate/acquire the newly obtained sub-sectional unsprung mass displacement Z1).

In this manner, the server 41 can decrease the number of the sub-sections Gd, each of which is a sub-section in which the unsprung mass displacement z1 has not been obtained. Furthermore, the server 41 can increase the number of the unsprung mass displacement z1 that can be used (or is available) to produce the data of the road surface information map 42a per one sub-section Gd. Accordingly, the server 41 can efficiently produce/generate the road surface information map 42a storing accurate data.

<Specific Operation>

Figure 5:
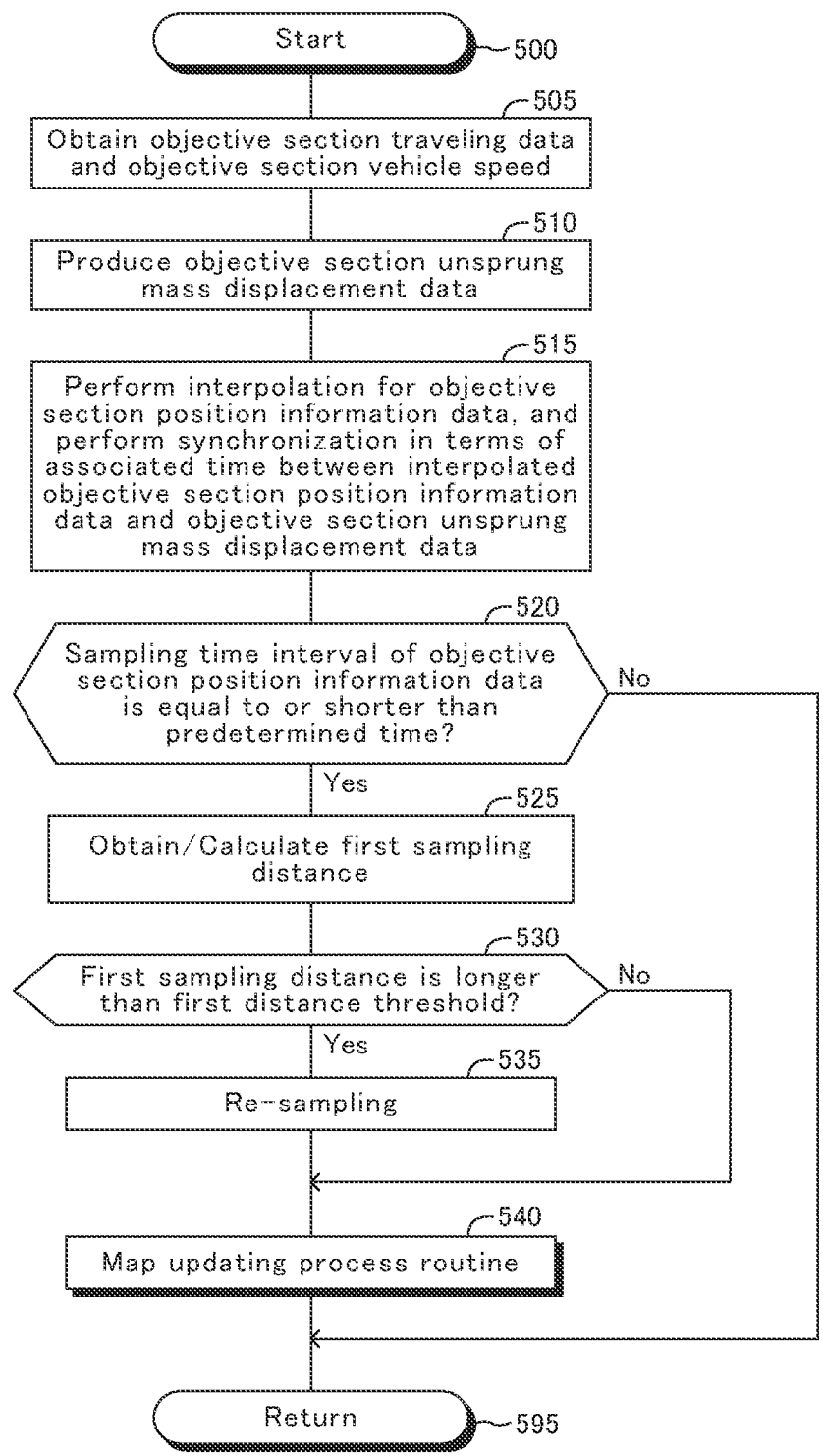
FIG. 5 is a flowchart showing a routine executed by a CPU of the server.

The CPU of the server 41 executes a routine shown by a flowchart in FIG. 5, every time an appropriate time elapses (e.g., every time the objective section sensing data is received). Accordingly, when an appropriate time comes, the CPU starts process of step 500 shown in FIG. 5, and sequentially executes processes of step 505 to step 515 so as to proceed to step 520.

Step 505: the CPU obtains (receives) the objective section traveling data (i.e., the objective section sensing data and the objective section position information data) and the objective section vehicle speed V from the on-board apparatus 20 (i.e., the vehicle 10). The objective section sensing data includes the objective section sprung mass member vertical acceleration data and the objective section vertical stroke data.

Step 510: the CPU generates/produces the objective section unsprung mass displacement data from the objective section sensing data.

Step 515: the CPU obtains the positions corresponding to the respective unsprung mass displacements z1 included in the objective section unsprung mass displacement data by performing the above-described data interpolation process for the objective section position information data. Thereafter, the CPU identifies (groups) "the unsprung mass displacements z1 in the objective section unsprung mass displacement data and the interpolated position in the objective section position information data" that are associated with the same time as each other. Namely, the CPU synchronizes them in terms of the associated time. In other words, the CPU obtains the unsprung mass displacements z1 included in the objective section unsprung mass displacement data and positions (position information) at which the respective unsprung mass displacements z1 is obtained. That is, the CPU acquires a plurality of sets, each set being a set of the unsprung mass displacement z1 and the sampling position for that unsprung mass displacement z1.

It should be noted that, if the sampling time interval ΔTB of the objective section unsprung mass displacement data is longer than the sampling time interval ΔTP of the objective section position information data, which is different from the above example, the CPU may obtain the unsprung mass displacements z1 corresponding to the respective positions included the objective section position information data by performing the data interpolation process for the objective section unsprung mass displacement data, at step 515.

When the CPU proceeds to step 520, it determines whether or not the sampling time interval ΔTP of the objective section position information data is equal to or shorter than a predetermined time.

If the sampling time interval Δ TP of the objective section position information data is longer than the predetermined time, it is likely that the position information obtained by being interpolated at step 515 is inaccurate. Thus, in this case, the CPU makes a "No" determination at step 520 to proceed to step 595 so as to terminate the present routine tentatively.

Whereas, when the sampling time interval ΔTP of the objective section position information data is equal to or shorter than the predetermined time, the CPU makes a "Yes" determination at step 520, and executes a process of step 525 described below to proceed to step 530.

Step 525: the CPU obtains the first sampling distance d1 by multiplying the objective section vehicle speed V by the sampling time interval ΔTB (d1=V·ΔTB).

It should be noted that, if the sampling time interval ΔTB of the objective section unsprung mass displacement data is longer than the sampling time interval ΔTP of the objective section position information data, which is different from the above example, at step 525, the CPU may obtain the first sampling distance d1 by multiplying the objective section vehicle speed V by the sampling time interval ΔTP of the objective section position information data (d1=V·ΔTP).

When the CPU proceeds to step 530, it determines whether or not the first sampling distance d1 is longer than the first distance threshold dth1.

When the first sampling distance d1 is longer than the first distance threshold dth1, the CPU makes a "Yes" determination at step 530, and executes a process of step 535 described below to proceed to step 540.

Step 535: the CPU re-samples (performs the re-sampling process for) the objective section unsprung mass displacement data and the interpolated objective section position information data (the objective section position information data that has been interpolated at step 515). In other words, the CPU obtains the unsprung mass displacement z1 at positions located at every above-described second sampling distance d2 and the position (position information) of that unsprung mass displacement z1 (i.e., the CPU obtains the unsprung mass displacement z1 at each of the sampling positions after the re-sampling (the sampling positions whose interval is the second sampling distance d2), and obtains the sampling position after the re-sampling). More specifically, the CPU performs the re-sampling process in such a manner that the sampling positions that are located every second sampling distance d2 exist in the interpolated objective section position information data obtained after the re-sampling process, and the unsprung mass displacements z1 of the respective sampling positions that are located every second sampling distance d2 exist in the objective section unsprung mass displacement data after the re-sampling process. Thereafter, the CPU obtains a plurality of the sets, each set having the unsprung mass displacement z1 and the sampling position for that unsprung mass displacement z1, from the thus re-sampled data.

Whereas, if the first sampling distance d1 is equal to or shorter than the first distance threshold dth1, it is unlikely that the re-sampling process is necessary. Therefore, in this case, the CPU makes a "No" determination at step 530, and directly proceeds to step 540. In this case, a plurality of the sets of the unsprung mass displacement z1 and the sampling position, obtained at step 515, are used in a map updating process routine at step 540 described below.

Figure 6:
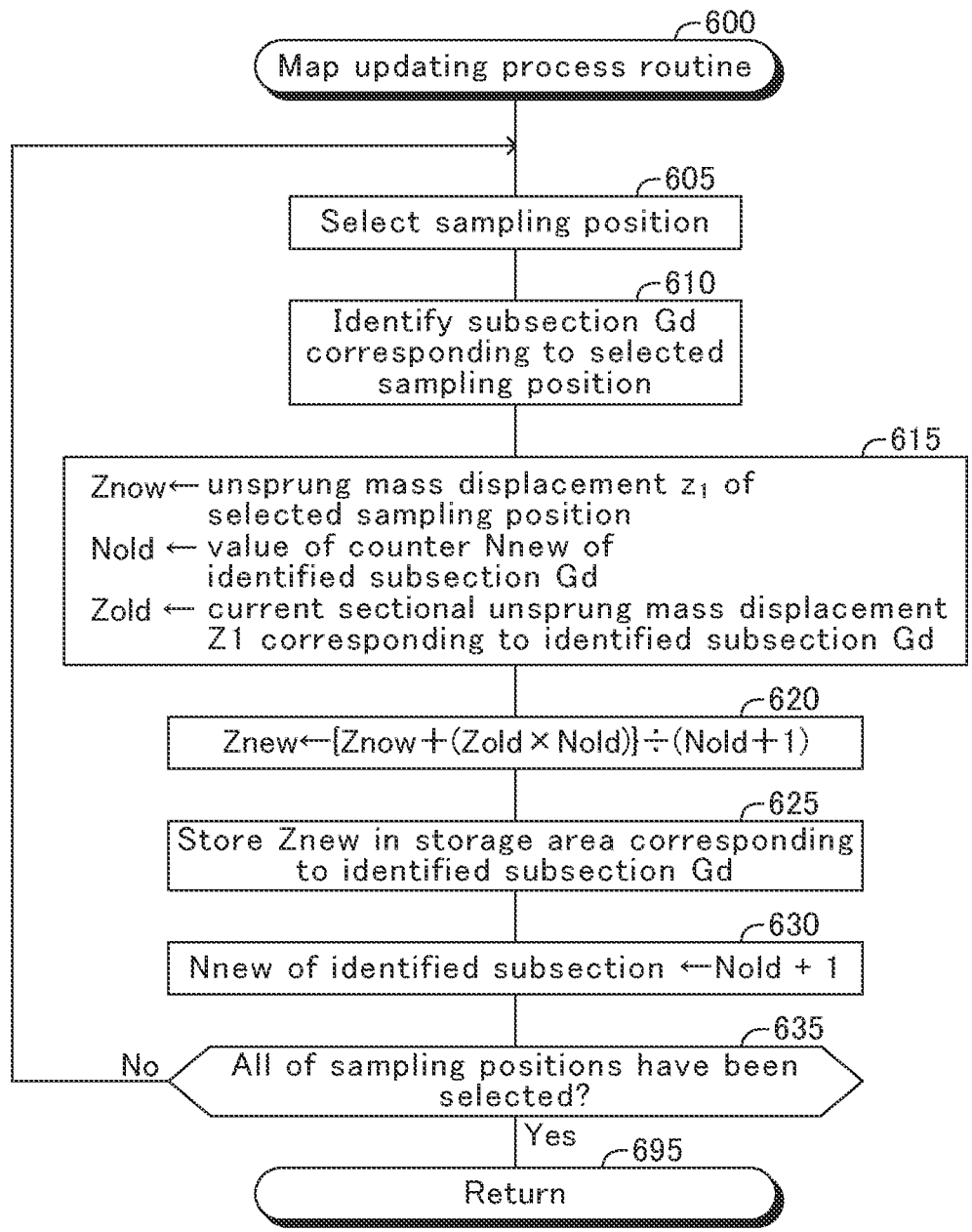
FIG. 6 is a flowchart showing a map updating routine executed by the CPU of the server.

When the CPU proceeds to step 540, it executes the map updating process routine illustrated in FIG. 6. More specifically, at step 540, the CPU proceeds to step 605 shown in FIG. 6 through step 600 shown in FIG. 6. At step 605, the CPU picks out (selects) an arbitrary sampling position that has not been selected yet from among the sampling positions obtained for the objective section ARj (i.e., among the sampling positions obtained at step 515 or step 535). Thereafter, the CPU sequentially executes processes of step 610 to step 630, described below, so as to proceed to step 635.

Step 610: the CPU identifies (determines) the sub-section Gd that corresponds to the selected sampling position (i.e., the sampling position selected at step 605), based on the selected sampling positions.

Step 615: the CPU lets a "variable Znow" be equal to the unsprung mass displacement z1 of/at the selected sampling position, and lets a current value of a "counter Nnew" of the sub-section Gd identified at step 610 be equal to a (value of a) "counter Nold". Furthermore, the CPU lets a "variable Zold" be equal to the current sub-sectional unsprung mass displacement Znew that corresponds to the sub-section Gd identified at step 610. It should be noted that, as described above, when the storage area corresponding to the identified sub-section Gd is in the initial state, the initial value of the sub-sectional unsprung mass displacement Z1 has been stored in that storage area, and "0" has been stored in that storage area as the value of the counter Nnew.

Step 620: the CPU obtains the value of the variable Znew according to an equation (8) described below.

$$Znew=(Znow+(Zold \cdot Nold))/(Nold+1) \qquad (8)$$

Namely, the CPU obtains a sum of the variable Znow and a value obtained by multiplying the variable Zold by the value of the counter Nold. The variable Znow here is equal to the unsprung mass displacement z1 of the selected sampling position. The variable Zold here is equal to the current sub-sectional unsprung mass displacement Z1 that corresponds to the identified sub-section Gd. The counter Nold here is equal to the current value of the counter Nnew stored in the storage area corresponding to the identified sub-section Gd. In addition, the CPU obtains the value of the variable Znew by dividing the thus obtained sum by a value obtained by adding "1" to the value of the counter Nold. The value of the counter Nold here is equal to the current value of the counter Nnew that has been stored in the storage area that corresponds to the identified sub-section Gd. In this manner, the CPU calculates/obtains an average (as the value of the variable Znew) of the unsprung mass displacements z1 that were used to calculate the current sub-sectional unsprung mass displacement Z1 and the unsprung mass displacements z1 of the selected sampling position.

Step 625: the CPU stores the thus calculated/obtained variable Znew in the storage area corresponding to the sub-section Gd identified at step 610, as the sub-sectional unsprung mass displacement Z1 (for that identified sub-section Gd).

Step 630: the CPU increments the value of the counter Nnew that has been stored in the storage area corresponding to the sub-section Gd identified at step 610 by "1".

At step 635, the CPU determines whether or not all of the sampling positions obtained with respect to the currently processed objective section ARj have been selected.

When all of the sampling positions with respect to the currently processed objective section ARj have not been selected yet, the CPU makes a "No" determination at step 635, and returns to step 605 so as to select another sampling position among the sampling positions that have not been selected yet. Whereas, when all of the sampling positions with respect to the currently processed objective section ARj have already been selected, the CPU makes a "Yes" determination at step 635, and proceeds to step 595 shown in FIG. 5 through step 695 to terminated the routine shown in FIG. 5 tentatively.

As has been described above, the cloud CL1 can efficiently produce the road surface information map 42a storing accurate data.

Second Embodiment

A preview damping control system that includes a road surface information producing apparatus (cloud CL1) according to a second embodiment of the present disclosure is different from the preview damping control system according to the first embodiment only in the following points.

The road surface information producing apparatus obtains through calculation the first sampling distance d1 based on the vehicle speed and "the sampling time interval ΔTP of the objective section position information data or the sampling time interval ΔTB of the objective section unsprung mass displacement data, whichever is longer".

The road surface information producing apparatus re-samples each of the objective section position information data and the objective section unsprung mass displacement data, so as to obtain a plurality of sets for sampling positions located at every second sampling distance d2, each set including the sampling position and the unsprung mass displacement z1 at that sampling position.

Figure 7:
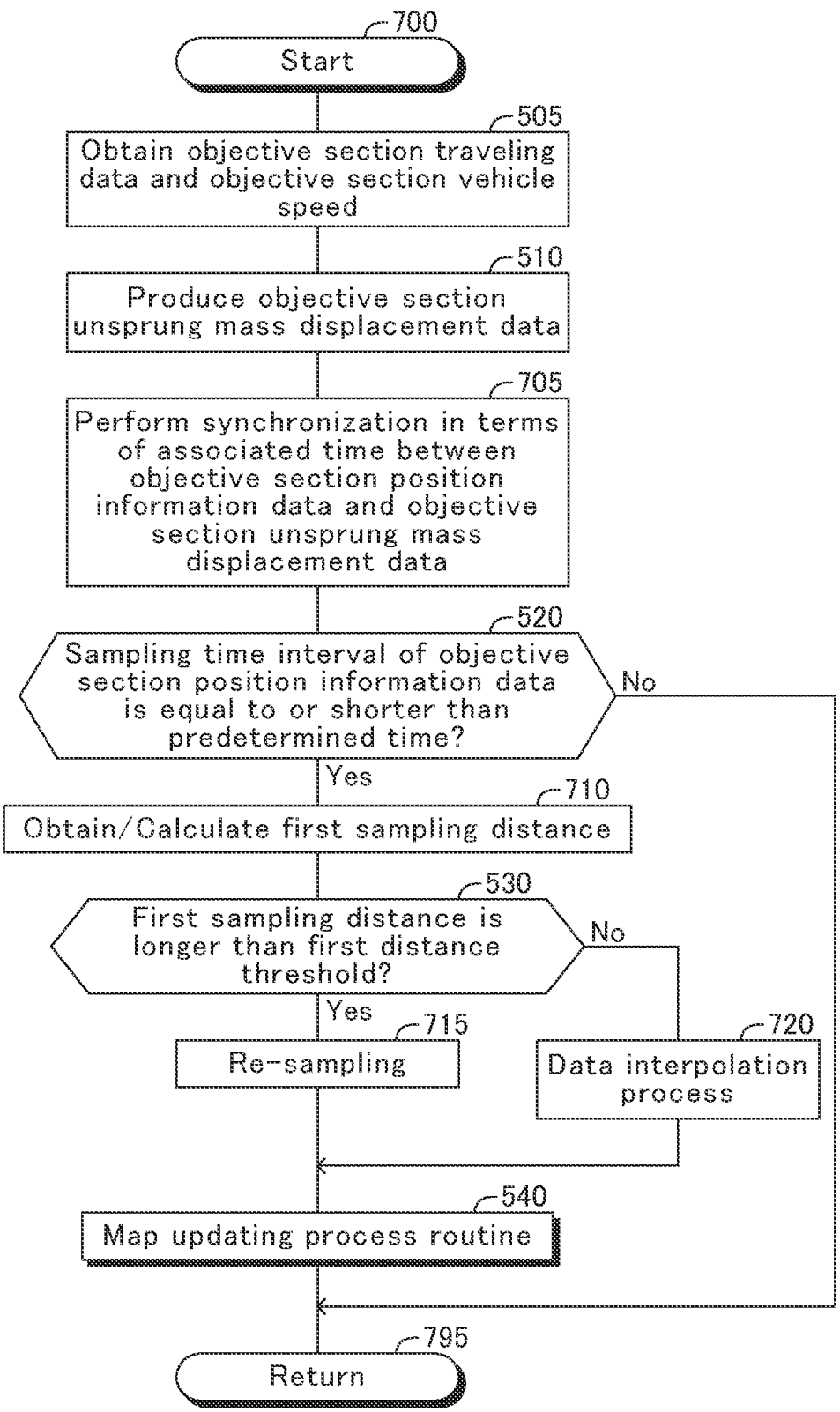
FIG. 7 is a flowchart showing a routine executed by the CPU of the server.

Hereinafter, these differences will be mainly described.
<Specific Operation>
The CPU executes a routine shown in FIG. 7 in place of the routine shown in FIG. 5, and the routine shown in FIG. 6, every time an appropriate time elapses (e.g., every time the objective section sensing data is received). The routine shown in FIG. 7 is different from the routine shown in FIG. 5 only in the following points.

Step 515 is replaced by step 705.
Step 525 is replaced by step 710.
Step 535 is replaced by step 715.
Step 720 is added between step 530 and step 540.

Hereinafter, these differences will be mainly described. A description of the routine shown in FIG. 6 is omitted, since it has been already described.

When the CPU proceeds to step 705, it synchronizes the objective section position information data and the objective section unsprung mass displacement data in terms of the associated time. Namely, the CPU identifies (groups) "the unsprung mass displacements z1 in the objective section unsprung mass displacement data and the position in the objective section position information data" that are associated with the same time as each other.

When the CPU proceeds to step 710, it obtains through calculation the first sampling distance d1 using "the sampling time interval ΔTP of the objective section position information data or the sampling time interval ΔTB of the objective section unsprung mass displacement data, whichever is longer". In the present example, the sampling time interval ΔTP is longer than the sampling time interval ΔTB. Therefore, the CPU multiplies the objective section vehicle speed V by the sampling time interval ΔTP of the objective section position information data, so as to obtain the first sampling distance d1. Note, however, if the sampling time interval ΔTB is longer than the sampling time interval ΔTP, which is different from the present example, the CPU multiplies the objective section vehicle speed V by the sampling time interval ΔTB of the objective section unsprung mass displacement data, so as to obtain the first sampling distance d1.

If the first sampling distance d1 is longer than the first distance threshold dth1 when the CPU executes the process of step 530 shown in FIG. 7, the CPU makes a "Yes" determination at step 530, and proceeds to step 715.

When the CPU proceeds to step 715, the CPU re-samples (performs the re-sampling process for both of) the objective section unsprung mass displacement data and the objective section position information data. More specifically, the CPU performs the re-sampling process in such a manner that the sampling positions (re-sampling positions) that are located every second sampling distance d2 exist in the objective section position information data obtained after the re-sampling process, and the unsprung mass displacements z1 of the respective sampling positions (the re-sampling positions) that are located every second sampling distance d2 exist in the objective section unsprung mass displacement data after the re-sampling process. Thereafter, the CPU obtains a plurality of the sets of the unsprung mass displacement z1 and the sampling position for that unsprung mass displacement z1, from the thus re-sampled data.

Whereas, if the first sampling distance d1 is equal to or shorter than the first distance threshold dth1 when the CPU executes the process of step 530, the CPU makes a "No" determination at step 530, and proceeds to step 720.

At step 720, the CPU performs a data interpolation process, using the objective section position information data in such a manner that a position (position information) at each sampling time of the objective section unsprung mass displacement data exists. Thereafter, the CPU obtains a plurality of the sets of the unsprung mass displacement z1 and the sampling position (position information) for that unsprung mass displacement z1, from the objective section unsprung mass displacement data and the interpolated objective section position information data. Note, however, if the sampling time interval ΔTB is longer than the sampling time interval ΔTP, which is different from the present example, the CPU performs the following processes at step 720. Namely, the CPU performs a data interpolation using the objective section unsprung mass displacement data in such a manner that an unsprung mass displacement z1 at each sampling time of the objective section position information data exists. Thereafter, the CPU obtains a plurality of the sets of the unsprung mass displacement z1 and the sampling position (position information) for that unsprung mass displacement z1, from the interpolated objective section unsprung mass displacement data and the objective section position information data.

It should be noted that the CPU may be configured to obtain a plurality of the sets of the unsprung mass displacement z1 and the sampling position (position information) for that unsprung mass displacement z1, from the objective section unsprung mass displacement data and the objective section position information data, without performing the data interpolation.

The present disclosure is not limited to the above embodiments, but may employ various modifications within the scope of the present disclosure.

Figure 8:
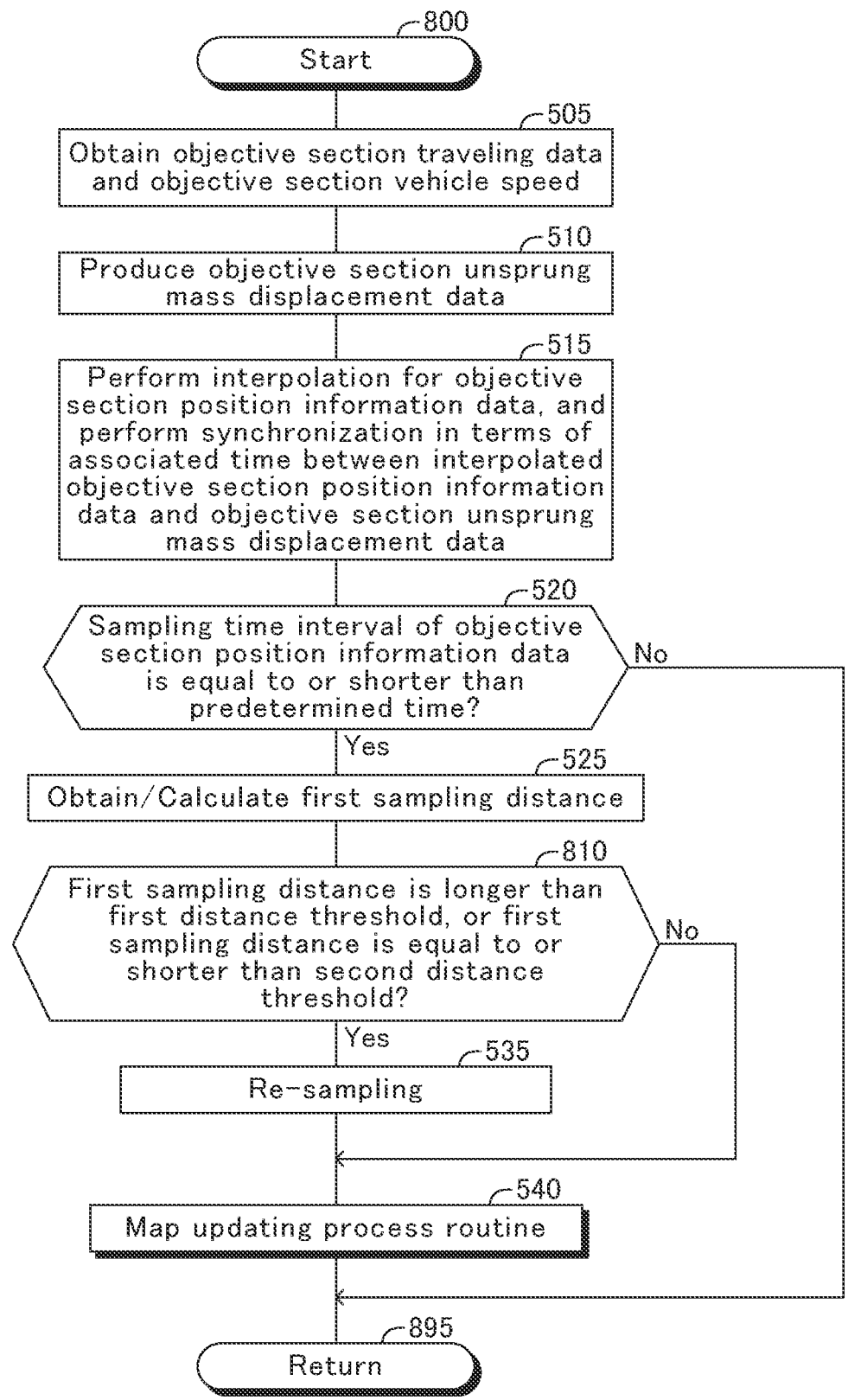
FIG. 8 is a flowchart showing a routine executed by the CPU of the server.

In the above-described first embodiment, the CPU may be configured to execute a routine shown in FIG. 8 in place of the routine shown in FIG. 5. The routine shown in FIG. 8 is different from the routine shown in FIG. 5 only in that step 530 shown in FIG. 5 is replaced by step 810 described below.

Step 810: the CPU determines whether or not the first sampling distance d1 is longer than the first distance threshold dth1, and determines whether or not the first sampling distance d1 is equal to or shorter than a second distance threshold dth2 which has been set at a distance shorter than the second sampling distance d2.

When the first sampling distance d1 is longer than the first distance threshold dth1, or when the first sampling distance d1 is equal to or shorter than the second distance threshold dth2, the CPU makes a "Yes" determination at step 810, and proceeds to step 535 so as to perform the data processing (re-sampling) described above. Thereafter, the CPU proceeds to step 540. Whereas, when the first sampling distance d1 is longer than the second distance threshold dth2 and is equal to or shorter than the first distance threshold dth1, the CPU makes a "No" determination at step 810, and directly proceeds to step 540.

When the objective section vehicle speed V is very low so that the first sampling distance d1 is equal to or shorter than the second distance threshold dth2, the number of the unsprung mass displacements z1 that are obtained for a single sub-section Gd becomes relatively large. If this happens, the sub-sectional unsprung mass displacement Z1 for that sub-section Gd becomes a value in which the unsprung mass displacements z1 obtained while the objective section vehicle speed V is very low are reflected excessively. Such a sub-sectional unsprung mass displacement Z1 is not preferable, because it becomes a value corresponding to a vehicle speed range that is greatly different from a typical vehicle speed range of when the preview damping control is appropriately performed.

In the above-described modification using the routine shown in FIG. 8, the objective section unsprung mass displacement data and the objective section position information data are re-sampled when the first sampling distance d1 is equal to or shorter than the second distance threshold dth2. Namely, the re-sampling is performed in such a manner that the unsprung mass displacements z1 at respective sampling positions that are located every second sampling distance d2 and the same sampling positions exist in the objective section unsprung mass displacement data and the objective section position information data (i.e., in such a manner that a distance between adjacent sampling positions, each having the unsprung mass displacement z1, is equal to the second sampling distance d2). In this case, the second sampling distance d2 is longer than the first sampling distance d1. Therefore, the number of the unsprung mass displacements z1 for a single sub-section Gd is substantially decreased. Accordingly, the above-described modification can decrease a possibility that the sub-sectional unsprung mass displacement Z1 stored in the storage area corresponding to a certain sub-section Gd becomes a value in which the unsprung mass displacements z1 obtained while the objective section vehicle speed V for that certain sub-section Gd is very low are reflected excessively.

In the first embodiment, the CPU may be configured to execute an unillustrated routine that is different from the routine shown in FIG. 5 only in that step 530 is omitted, in place of the routine shown in FIG. 5. In this modification, the CPU proceeds to step 535 after executing the process of step 525 regardless of the first sampling distance d1, so that the re-sampling is always performed.

In the second embodiment, the CPU may be configured to execute an unillustrated routine that is different from the routine shown in FIG. 7 only in that step 530 is replaced with step 810 that has already been described, in place of the routine shown in FIG. 7.

In the second embodiment, the CPU may be configured to execute an unillustrated routine that is different from the routine shown in FIG. 7 only in that step 530 and step 720 are omitted, in place of the routine shown in FIG. 7.

In each of the embodiments described above, the road surface displacement correlating value is the unsprung mass displacement z1, however, the road surface displacement correlating value may be the road surface vertical displacement z0. In this case, the sub-sectional road surface displacement correlating value is a sub-sectional road surface displacement Z0 that is obtained through calculation based on the road surface vertical displacement z0 for a part of a road that corresponds to each of the sub-sections Gd. In this case, the objective section sensing data is time series data of the road surface vertical displacement z0 that the preview sensor 33 detects when the vehicle 10 travels in the objective section. The server 41 obtains the objective section sensing data as the time series data of the road surface vertical displacement z0, after performing data processing (BPF processing) as appropriate.

Furthermore, when the road surface displacement correlating value is the road surface displacement z0, the on-board apparatus 20 may include an unillustrated laser displacement sensor disposed at a predetermined position of the vehicle 10. The laser displacement sensor is configured to detect a distance in the vertical direction between the vehicle body 10a of the vehicle 10 (i.e., the laser displacement sensor) and a road surface (hereinafter, the distance may be referred to as a "vertical relative displacement between the vehicle body 10a and the road surface"), and to generate a signal indicative of the vertical relative displacement between the vehicle body 10a and the road surface. The ECU 30 obtains the signal indicative of the vertical relative displacement between the vehicle body 10a and the road surface, every time a constant sampling time elapses.

In this case, the objective section sensing data is time series data of the vertical relative displacement between the vehicle body 10a and the road surface detected by the laser displacement sensor of when the vehicle 10 travels in the objective section and the time series data of the vertical acceleration of the sprung mass member. The server 41 performs an offline processing of the objective section sensing data so as to produce/generate the time series data of the road surface vertical displacement z0.

In each of the above-described embodiments, the on-board apparatus 20 may include an unillustrated unsprung mass member vertical acceleration sensor. In this case, the cloud CL1 may be configured to generate/produce the time series data of the unsprung mass displacement data z1 by performs offline processing (second order integration process and BPF process) of the time series data of the vertical acceleration of the unsprung mass member detected by the unsprung mass member vertical acceleration sensor.

In each of the above-described embodiments, the cloud CL1 may be configured to perform data processing for generating/producing the time series data of the road surface vertical displacement z0 or the time series data of the unsprung mass displacement z1, using an observer, based on at least one of time series data of the sensor values detected by the road-surface-correlating-information sensor RS1.

In each of the above-described embodiments, a road surface information producing apparatus having functions similar to the ones of the cloud CL1 may be mounted on the vehicle 10, and the road surface information producing apparatus may produce the road surface information map 42a.

In each of the above-described embodiments, the position information obtaining device 35 may be configured to obtain the present position of the vehicle 10 as follows. Namely, the position information obtaining device 35 may include a LiDAr and a camera sensor, and may detect a group of feature points of a shape of the road and structures/buildings around the vehicle 10 using the LiDAr and/or the camera sensor. The position information obtaining device 35 may be configured to obtain the present position of the vehicle 10 based on the group of the detected feature points and a three dimensional map (refer to, for example, Japanese Patent Application Laid-Open No. 2016-192028 and Japanese Patent Application Laid-Open No. 2020-16541).

What is claimed is:

1. A road surface information producing apparatus comprising:
    a storage device including a road surface information map that has storage areas corresponding to certain sub-sections into which a virtual area corresponding to a predetermined section of a road is divided, wherein a sub-sectional road surface displacement correlating value correlated with a vertical displacement of a road surface of the certain sub-section among said sub-sections is stored in one of said storage areas that corresponds to said certain sub-section; and
    an information processing device configured to store said sub-sectional road surface displacement correlating value in one of said storage areas, and configured to:
        obtain first data from a vehicle via a communication link when said vehicle travels through each of said sections of a road, said first data including:
            received sensor values detected by a vertical acceleration sensor and a stroke sensor, both of which are mounted on said vehicle,
            wherein said information processing device uses said sensor values to obtain said sub-sectional road surface displacement correlating value, and determines a time at which said sensor values were detected by the vertical acceleration sensor and the stroke sensor; and
            position information correlated with a position of said vehicle obtained by a position information obtaining device mounted on said vehicle, and a time at which said position information was obtained; and
        obtain second data, based on said first data, said second data including time series data for acquiring a data set that includes a plurality of sets each of which includes a road surface displacement correlating value correlated with a vertical displacement of a road surface and a sampling position that is a detecting position of said road surface displacement correlating value;
        obtain said data set from said second data;
        calculate a first sampling distance that corresponds to a distance between two of said sampling positions adjacent to each other in said data set obtained from said second data;
        reacquire, when said first sampling distance is longer than a first distance threshold, said data set from data obtained by performing re-sampling to execute an interpolation using said second data in such a manner that any one of said distances between two of said sampling positions adjacent to each other is equal to or shorter than said first distance threshold and said road surface displacement correlating value corresponding to each of said sampling positions exists; and
        calculate, using said data set, a first average indicative of an average of said road surface displacement correlating values of said sampling positions included in the certain sub-section of a plurality of said sub-sections, for each said certain sub-section, said certain sub-section being a sub-section to which said sampling position belongs, and store, as said sub-sectional road surface displacement correlating value, said first average in one of said storage areas that corresponds to said certain sub-section.

2. The road surface information producing apparatus according to claim 1, wherein,
    said information processing device is configured to:
        obtain a vehicle speed of said vehicle of when said vehicle travels through said predetermined section from said vehicle via said communication link;
        obtain, as said second data, time series data of said road surface displacement correlating value and time series data of a detecting position of said road-surface-correlating-information sensor from said first data; and
        calculate said first sampling distance by multiplying said vehicle speed by a sampling time interval that is either a sampling time interval of said time series data of said road surface displacement correlating value or a sampling time interval of said time series data of a detecting position of said road-surface-correlating-information sensor, whichever is longer.

3. The road surface information producing apparatus according to claim 1, wherein,
    said information processing device is configured to:
        obtain a vehicle speed of said vehicle of when said vehicle travels through said predetermined section from said vehicle via said communication link;
        obtain time series data of said road surface displacement correlating value and time series data of a detecting position of said road-surface-correlating-information sensor from said first data;

perform an interpolation process on either said time series data of said road surface displacement correlating value or said time series data of a detecting position of said road-surface-correlating-information sensor in such a manner that both of said road surface displacement correlating value and said detecting position exist at a sampling time having a sampling time interval of said time series data of said road surface displacement correlating value or a sampling time interval of said time series data of a detecting position of said road-surface-correlating-information sensor, whichever is shorter, and obtain, as said second data, data including an interpolated data that is one of said time series data that has been interpolated and the other of said time series data among said time series data of said road surface displacement correlating value and said time series data of a detecting position of said road-surface-correlating-information sensor; and calculate said first sampling distance by multiplying said vehicle speed by a sampling time interval that is either said sampling time interval of said time series data of said road surface displacement correlating value or said sampling time interval of said time series data of a detecting position of said road-surface-correlating-information sensor, whichever is shorter.

4. The road surface information producing apparatus according to claim 1, wherein,
said information processing device is configured to perform said re-sampling process in such a manner that each distance between two adjacent sampling positions is a constant second sampling distance that is equal to or shorter than said first distance threshold.

5. The road surface information producing apparatus according to claim 4, wherein,
said information processing device is configured to perform said re-sampling process when said first sampling distance is equal to or shorter than a second distance threshold that has been set at a distance shorter than said second sampling distance.

6. The road surface information producing apparatus according to claim 1, wherein,
said information processing device is configured to newly store, when said sub-sectional road surface displacement correlating value has already been stored in said storage area that corresponds to said particular sub-section, a second average in said storage area that corresponds to said particular sub-section, as an updated sub-sectional road surface displacement correlating value, the second average representing an average among said road surface displacement correlating values of said sampling positions included in said particular sub-section and said sectional road surface displacement correlating value that has already been stored in said storage area.

7. The road surface information producing apparatus according to claim 1, wherein,
said road surface displacement correlating value is an unsprung mass displacement representing a vertical displacement of an unsprung mass member of said vehicle, and
said sensor value is either a combination of a vertical acceleration of a sprung mass member of said vehicle and a vertical relative displacement between said sprung mass member and said unsprung mass member, or a vertical acceleration of said unsprung mass member.

8. A vehicle control system including a road surface information producing apparatus, a first vehicle, and a second vehicle, that are communicable to one another, wherein,
said road surface information producing apparatus comprises:
a storage device including a road surface information map that has storage areas corresponding to certain sub-sections into which a virtual area corresponding to a predetermined section of a road is divided, wherein a sub-sectional road surface displacement correlating value correlated with a vertical displacement of a road surface of the certain sub-section among said sub-sections is stored in one of said storage areas that corresponds to said certain sub-section; and
an information processing device configured to store said sub-sectional road surface displacement correlating value in one of said storage areas, and configured to:
obtain first data from said first vehicle via a communication link when said first vehicle travels through said predetermined section, said first data including:
received sensor values detected by a vertical acceleration sensor and a stroke sensor, both of which are mounted on said first vehicle,
wherein said information device uses said sensor values to obtain said sub-sectional road surface displacement correlating value and determines a time at which said sensor values were detected by the vertical acceleration sensor and the stroke sensor; and
position information correlated with a position of said first vehicle obtained by a position information obtaining device mounted on said first vehicle and a time at which said position information was detected; and
obtain second data, based on said first data, said second data including time series data for acquiring a data set that includes a plurality of sets each of which includes a road surface displacement correlating value correlated with a vertical displacement of a road surface and a sampling position that is a detecting position of said road surface displacement correlating value;
obtain said data set from said second data;
calculate a first sampling distance that corresponds to a distance between two of said sampling positions adjacent to each other in said data set obtained from said second data;
reacquire, when said first sampling distance is longer than a first distance threshold, said data set from data obtained by performing re-sampling to execute an interpolation using said second data in such a manner that any one of said distances between two of said sampling positions adjacent to each other is equal to or shorter than said first distance threshold and said road surface displacement correlating value corresponding to each of said sampling positions exists; and
calculate, using said data set, a first average indicative of an average of said road surface displacement correlating values of said sampling positions included in the certain sub-section of a plurality of said sub-sections, for each said certain sub-section, said certain sub-section being a sub-section to which said sampling position belongs, and store, as said sub-sectional road surface displacement correlating value, said first average in one of said storage areas that corresponds to said certain sub-section, and at least one of said first vehicle and said second vehicle is configured to receive data for control from said road surface information producing apparatus so as to utilize said data for control for controlling said one of said first vehicle and said second vehicle, said data for control, obtained based on said road surface information map, including position information of said sub-section and said road surface displacement correlating value associated with said position information.

* * * * *